(12) United States Patent
Park et al.

(10) Patent No.: US 11,156,851 B2
(45) Date of Patent: Oct. 26, 2021

(54) LENS MOVING APPARATUS

(71) Applicant: LG INNOTEK CO., LTD., Seoul (KR)

(72) Inventors: Sang Ok Park, Seoul (KR); Byung Wook Son, Seoul (KR); Kyoung Ho Yoo, Seoul (KR); Jun Taek Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 171 days.

(21) Appl. No.: 16/241,346

(22) Filed: Jan. 7, 2019

(65) Prior Publication Data

US 2019/0155047 A1  May 23, 2019

Related U.S. Application Data

(63) Continuation of application No. 15/005,122, filed on Jan. 25, 2016, now Pat. No. 10,216,000.

(30) Foreign Application Priority Data

Jan. 23, 2015  (KR) .................. 10-2015-0011214

(51) Int. Cl.
  *G02B 27/64* (2006.01)
  *H04N 5/232* (2006.01)
  *G02B 7/08* (2021.01)

(52) U.S. Cl.
  CPC ............. *G02B 27/646* (2013.01); *G02B 7/08* (2013.01); *H04N 5/23287* (2013.01)

(58) Field of Classification Search
  CPC ......... G02B 27/646; G02B 7/08; H02K 41/02
  See application file for complete search history.

(56) References Cited

U.S. PATENT DOCUMENTS 4,840,457 A * 6/1989 Remer ................ G11B 7/0932
  359/824
5,875,162 A   2/1999 Baba
  (Continued)

FOREIGN PATENT DOCUMENTS

CN       1892824 A    1/2007
CN     102819086 A   12/2012
  (Continued)

OTHER PUBLICATIONS

Office Action dated Oct. 22, 2019 in Chinese Application No. 201610049681.X.
  (Continued)

*Primary Examiner* — Joseph P Martinez
*Assistant Examiner* — Vipin Patel
(74) *Attorney, Agent, or Firm* — Saliwanchik, Lloyd & Eisenschenk

(57) ABSTRACT

Disclosed is a lens moving apparatus. The lens moving apparatus includes a moving unit having at least one lens installed therein and moving by electromagnetic interaction between magnets and coils, elastic members configured to support the moving unit, and position sensors configured to sense change of electromagnetic force emitted from the magnets according to movement of the moving unit and to output an output signal based on a result of sensing, and a primary resonant frequency of frequency response characteristics according to gain of a ratio of the output signal of the position sensors to an input signal applied to the coils is 30 Hz to 200 Hz.

20 Claims, 12 Drawing Sheets

(56) References Cited

U.S. PATENT DOCUMENTS

| | | | | |
|---|---|---|---|---|
| 6,084,835 | A | * 7/2000 | Buehler | G11B 7/094 369/44.32 |
| 2004/0174076 | A1 | 9/2004 | Knirck et al. | |
| 2012/0314308 | A1 | * 12/2012 | Ikushima | G02B 27/646 359/814 |
| 2013/0039640 | A1 | 2/2013 | Sekimoto | |
| 2014/0327965 | A1 | * 11/2014 | Chen | G02B 7/08 359/557 |

FOREIGN PATENT DOCUMENTS

| | | |
|---|---|---|
| CN | 103018873 A | 4/2013 |
| CN | 104020546 A | 9/2014 |
| CN | 104142553 A | 11/2014 |
| CN | 104204934 A | 12/2014 |
| JP | 2010096807 A | 4/2010 |
| JP | 2013024938 A | 2/2013 |
| KR | 10-2001-0038040 A | 5/2001 |
| KR | 10-0803248 B1 | 2/2008 |
| KR | 20140089780 A | 7/2014 |
| KR | 10-2014-0135154 A | 11/2014 |

OTHER PUBLICATIONS

Office Action dated Sep. 14, 2017 in U.S. Appl. No. 15/005,122.
Office Action dated Apr. 19, 2018 in U.S. Appl. No. 15/005,122.
Office Action dated Jul. 2, 2021 in Chinese Application No. 202011010441.1.
Office Action dated Jun. 11, 2021 in Korean Application No. 10-2015-0011214.

* cited by examiner

LENS MOVING APPARATUS

CROSS-REFERENCE TO RELATED APPLICATIONS

This application is a continuation of U.S. application Ser. No. 15/005,122, filed Jan. 25, 2016; which claims benefit under 35 U.S.C. § 119 to Korean Application No. 10-2015-0011214, filed Jan. 23, 2015; which are hereby incorporated by reference in their entirety.

TECHNICAL FIELD

Embodiments relate to a lens moving apparatus.

BACKGROUND

In general, it is difficult to apply voice coil motor (VCM) technology, used in general camera modules, to a micromini camera module for low power consumption and, thus, research regarding such a micromini camera module has been carried out.

A camera module mounted in small-scale electronic products, such as smartphones, may frequently receive impact during use and be finely shaken by hand tremor of a user during photographing. In consideration of this aspect, development of technology for additionally installing a unit to inhibit handshake in a camera module is required.

Various units to inhibit handshake have been researched. Thereamong, there is handshake compensation technology in which an optical module moves in x-axis and y-axis directions perpendicular to an optical axis. In this technology, an optical system moves in planes perpendicular to the optical axis so as to correct an image and thus has a complicated structure unsuitable for miniaturization. Further, accurate and rapid focusing of the optical module is required.

BRIEF SUMMARY

Embodiments provide a lens moving apparatus which may secure stable AF feedback control and OIS feedback control.

In one embodiment, a lens moving apparatus includes a moving unit having at least one lens installed therein and moving by electromagnetic interaction between magnets and coils, elastic members configured to support the moving unit, and position sensors configured to sense change of electromagnetic force emitted from the magnets according to movement of the moving unit and to output an output signal based on a result of sensing, wherein a primary resonant frequency of frequency response characteristics according to gain of a ratio of the output signal of the position sensors to an input signal applied to the coils is 30 Hz to 200 Hz.

A secondary resonant frequency of frequency response characteristics according to gain of the ratio of the output signal of the position sensors to the input signal applied to the coils may exceed 200 Hz.

The width of the elastic members may be predetermined times or more the thickness of the elastic members, and the predetermined times may be 2 times to 3 times.

The thickness of the elastic members may be 30 μm to 50 μm, the width of the elastic members may be equal to or more than a reference width and the reference width may be 60 μm to 100 μm.

A frequency corresponding to a gain of 0 dB in frequency response characteristics according to gain of the ratio of the output signal of the position sensors to the input signal applied to the coils may be 60 Hz to 200 Hz.

The primary resonant frequency may be 40 Hz to 120 Hz.

The primary resonant frequency may be 50 Hz to 100 Hz.

The secondary resonant frequency may be equal to or more than 250 Hz.

The elastic members may include upper elastic members coupled with the upper end of a bobbin and the upper end of a housing and lower elastic members coupled with the lower end of the bobbin and the lower end of the housing.

Each of the upper and lower the elastic members may include an inner frame coupled with the bobbin, an outer frame coupled with the housing, and a frame connection part configured to connect the inner frame and the outer frame, the width of the frame connection part may be predetermined times or more the thickness of the upper and lower elastic members and the predetermined times may be 2 times to 3 times.

Each of the position sensors may include a driver to execute proportional integral derivative (PID) control.

In another embodiment, a lens moving apparatus includes a bobbin including a lens barrel, a housing configured to receive the bobbin, elastic members coupled with the bobbin and the housing, a first coil disposed on the bobbin, magnets disposed on the housing, a circuit board disposed under the housing, second coils disposed on the circuit board, a first position sensor configured to output a first output signal based on a result of sensing the strength of a magnetic field of the magnets according to movement of the bobbin, and second position sensors configured to output a second output signal based on a result of sensing the strength of a magnetic field of the magnets according to movement of the housing, wherein a primary resonant frequency of frequency response characteristics according to gain of a first transfer function has a frequency domain of 30 Hz to 200 Hz, a secondary resonant frequency of frequency response characteristics according to gain of the first transfer function has a frequency domain exceeding 200 Hz, and the first transfer function is a ratio of the output signal of the second position sensors to an input signal applied to the second coils.

The elastic members may include upper elastic members coupled with the upper end of the bobbin and the upper end of the housing and lower elastic members coupled with the lower end of the bobbin and the lower end of the housing.

The width of the upper and lower elastic members may be predetermined times or more the thickness of the upper and lower elastic members, and the predetermined times may be 2 times to 3 times.

Each of the upper and lower the elastic members may include an inner frame coupled with the bobbin, an outer frame coupled with the housing and a frame connection part configured to connect the inner frame and the outer frame, and the width of the upper and lower elastic members may be the width of the frame connection part.

The thickness of the upper and lower elastic members may be 30 μm to 50 μm, the width of the upper and lower elastic members may be equal to or more than a reference width, and the reference width may be 60 μm to 100 μm.

A primary resonant frequency of frequency response characteristics according to gain of a second transfer function may have a frequency domain of 30 Hz to 200 Hz, a secondary resonant frequency of frequency response characteristics according to gain of the second transfer function may have a frequency domain exceeding 200 Hz, and the second transfer function may be a ratio of the output signal of the first position sensor to an input signal applied to the first coil.

Each of the second position sensors may include a driver to execute proportional integral derivative (PID) control.

The primary resonant frequency of frequency response characteristics according to gain of the first transfer function may be 40 Hz to 120 Hz and the secondary resonant frequency of frequency response characteristics according to gain of the first transfer function may be equal to or more than 250 Hz.

The primary resonant frequency of frequency response characteristics according to gain of the first transfer function may be 50 Hz to 100 Hz and the secondary resonant frequency of frequency response characteristics according to gain of the first transfer function may be equal to or more than 250 Hz.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
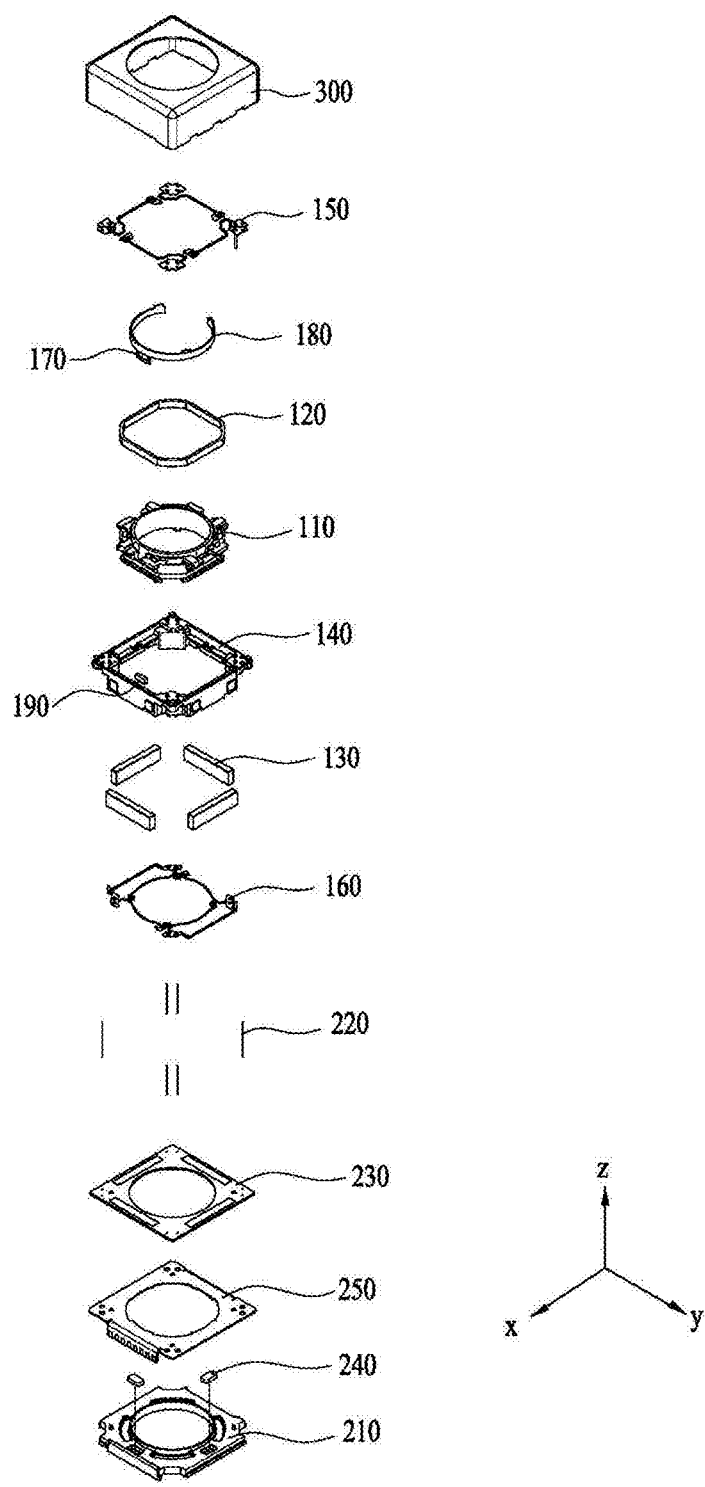
FIG. 1 is an exploded perspective view of a lens moving apparatus in accordance with one embodiment.

Hereinafter, embodiments will be described with reference to the annexed drawings. In the following description of the embodiments, it will be understood that, when each layer (film), region, pattern or structure is referred to as being formed "on" or "under" a substrate, a layer (film), a region, a pad or a pattern, it can be directly "on" or "under" the other element or be indirectly formed with one or more intervening elements therebetween. In addition, it will also be understood that "on" or "under" each element may be described based on the drawings.

Those skilled in the art will appreciate that the sizes of elements in the drawings are exaggerated, reduced or omitted for ease and clarity in description. Further, the sizes of the respective elements do not mean actual sizes thereof. In addition, in the drawings, the same or similar elements are denoted by the same reference numerals even though they are depicted in different drawings.

Hereinafter, a lens moving apparatus in accordance with embodiments will be described with reference to the annexed drawings. For convenience of description, although the lens moving apparatus in accordance with the embodiments will be described using a Cartesian-coordinate system (x, y, z), the disclosure is not limited thereto and other coordinate systems may be used. In the respective drawings, the x-axis and the y-axis mean directions perpendicular to the direction of an optical axis, i.e., z-axis, and, for convenience, an optical axis (z-axis) direction may be referred to as "first direction", an x-axis direction may be referred to as "second direction", and a y-axis direction may be referred to as "third direction".

"A handshake compensation device" applied to a small-scale camera module of a mobile device, such as a smartphone or a tablet PC, may mean a device configured to inhibit, when a still image is photographed, blurring of the image due to vibration caused by user's hand shake.

Further, an "autofocus device" is a device which automatically focuses an image of a subject onto an image sensor surface. The handshake compensation device and the autofocus device may be variously implemented and a lens moving apparatus in accordance with one embodiment may execute an autofocus operation in which an optical module including at least one lens moves in the first direction parallel with an optical axis and a handshake compensation operation in which the optical module moves in the second and third directions perpendicular to the first direction.

FIG. 1 is an exploded perspective view of a lens moving apparatus 100 in accordance with one embodiment.

With reference to FIG. 1, the lens moving apparatus 100 may include a cover member 300, upper elastic members 150, a first coil 120, a bobbin 110, a housing 140, second magnets 130, lower elastic members 160, a plurality of support members 220, second coils 230, a circuit board 250, second position sensors 240 and a base 210. The lens moving apparatus 100 may further include a sensor substrate 180, a first position sensor 170 and a first magnet 190.

The bobbin 110, the first coil 120, the second magnets 130, the housing 140, the upper elastic members 150 and the lower elastic members 160 may form a first lens moving unit. Further, the first lens moving unit may further include the first position sensor 170. The first lens moving unit may be used to execute the lens focusing operation.

Further, the first lens moving unit, the second coils 230, the circuit board 250, the base 210 and the support members 220 may form a second lens moving unit. Further, the second lens moving unit may further include the second position sensors 240. The second lens moving unit may be used to execute the handshake compensation operation.

First, the cover member 300 will be described.

The cover member 300 receives the upper elastic members 150, the bobbin 110, the first coil 120, the housing 140, the first magnet 190, the second magnets 130, the lower elastic members 160, the support members 220, the second coils 230 and the circuit board 250 in a reception space formed by the cover member 300 and the base 210.

The cover member 300 may have a box shape including an opened lower part, an upper end part and side walls, and the lower part of the cover member 300 may be coupled with the upper part of the base 210. The upper end part of the cover member 300 may have a polygonal shape, for example, a rectangular or octagonal shape.

The cover member 300 may be provided with a hollowness formed at the upper end part thereof so as to expose a lens (not shown) coupled with the bobbin 110 to external light. Further, a window formed of a light-transmitting material may be additionally provided on the hollowness of the cover member 300 to inhibit foreign substances, such as dust or moisture, from being introduced into a camera module.

The cover member 300 may be formed of a non-magnetic material, such as SUS, so as to inhibit magnetic attraction to the second magnets 130, or be formed of a magnetic material so as to execute the function of a yoke.

Figure 2:
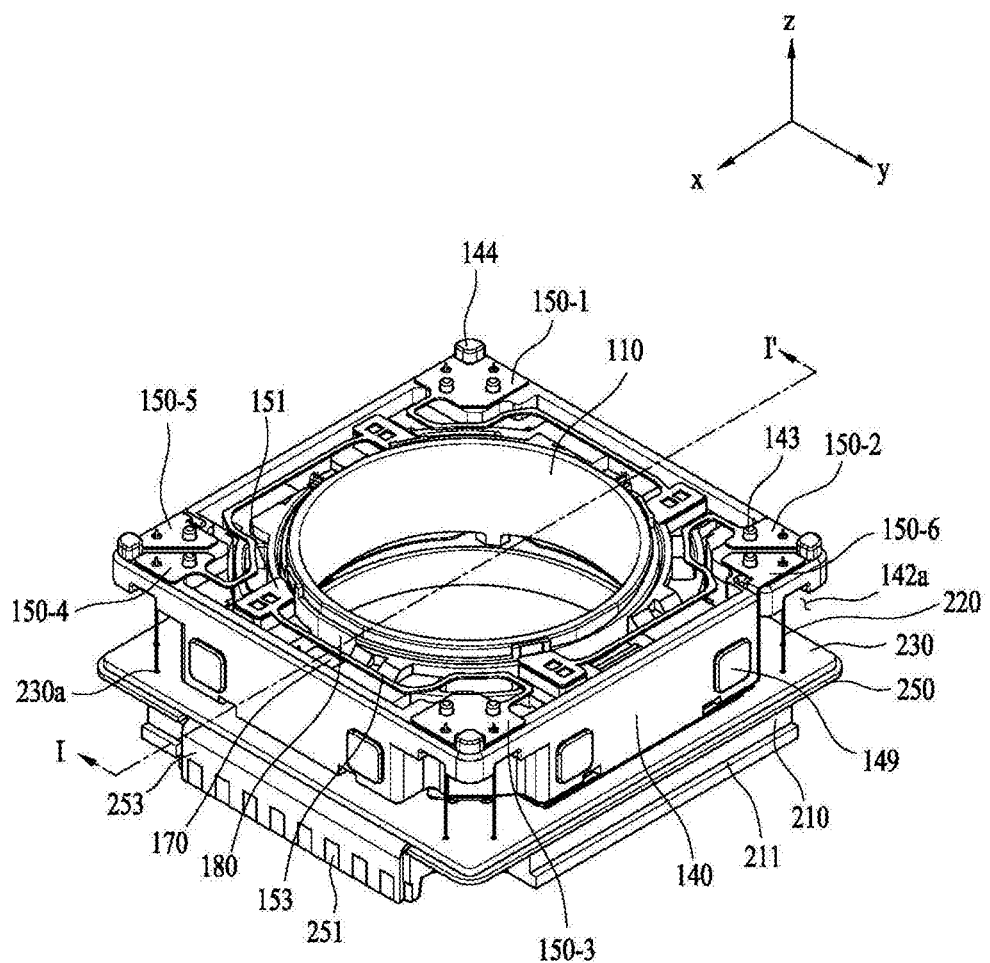
FIG. 2 is an assembled perspective view of the lens moving apparatus of FIG. 1, from which a cover member is removed.
Figure 3:
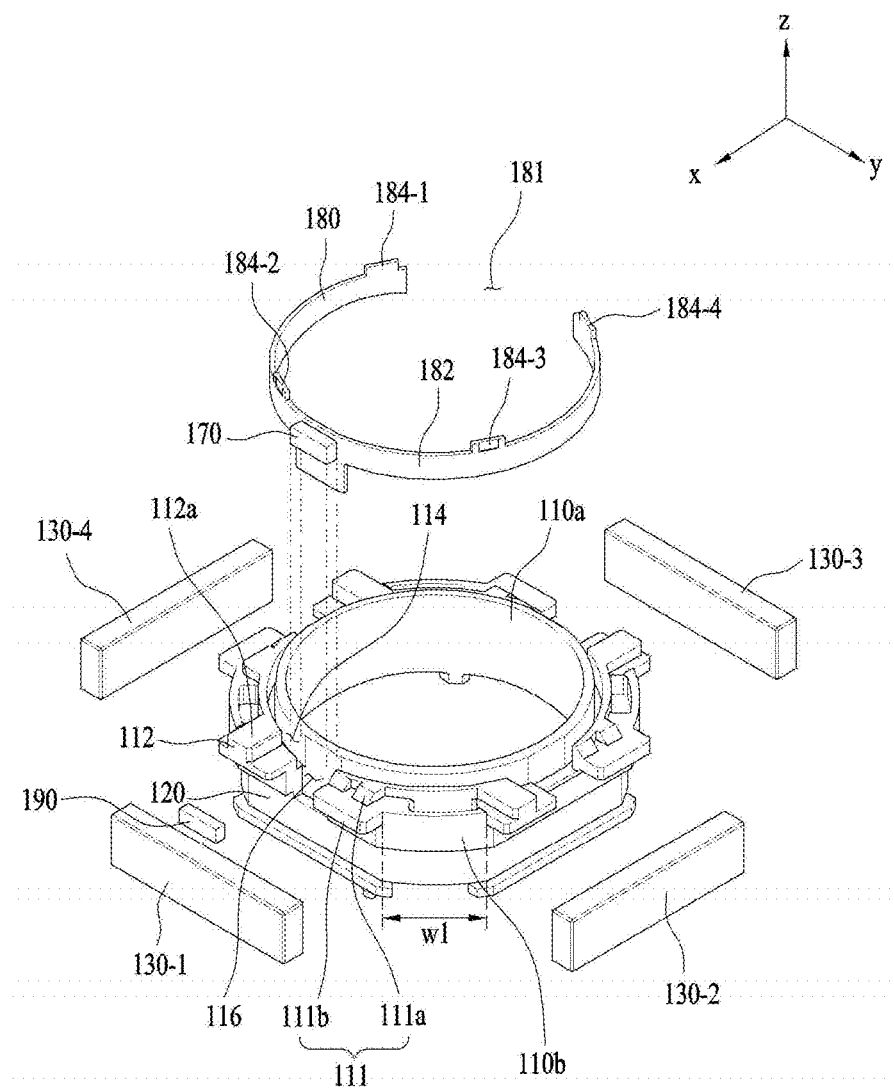
FIG. 3 is an exploded perspective view of a bobbin, a first coil, second magnets, a first position sensor and a sensor substrate shown in FIG. 1.

FIG. 2 is an assembled perspective view of the lens moving apparatus 100 of FIG. 1, from which the cover member 300 is removed, and FIG. 3 is an exploded perspective view of the bobbin 110, the first coil 120, the second magnets 130: 130-1, 130-2, 130-3 and 130-4, the first position sensor 170 and the sensor substrate 180 shown in FIG. 1.

Next, the bobbin 110 will be described.

With reference to FIGS. 2 and 3, the bobbin 110 is disposed within the housing 140, which will be described later, and is movable in the optical axis direction or the first direction parallel with the optical axis direction, for example, the z-axis direction, by electromagnetic interaction between the first coil 120 and the second magnets 130.

Although not shown in the drawings, the bobbin 110 may include a lens barrel (not shown) in which at least one lens is installed, and the lens barrel may be coupled with the inside of the bobbin 110 through various methods.

The bobbin 110 may have a hollow structure so as to mount the lens or the lens barrel therein, and the hollowness of the bobbin 110 may have a circular shape, an oval shape or a polygonal shape but the disclosure is not limited thereto.

The bobbin 110 may include first and second protrusions 111 and 112.

Each of the first protrusions 111 of the bobbin 110 may include a guide part 111a and a first stopper 111b. The guide parts 111a of the bobbin 110 may protrude in the second and third directions perpendicular to the first direction and serve to guide the installed position of the upper elastic members 150. The second protrusions 112 of the bobbin 112 may protrude in the second and third directions perpendicular to the first direction.

The first stoppers 111b of the first protrusions 111 and the second protrusions 112 of the bobbin 110 may serve to inhibit the bottom surface of the body of the bobbin 110 from directly colliding with the base 210 and the upper surface of the circuit board 250, even if the bobbin 110 moves beyond a regulated range when the bobbin 110 moves in the first direction parallel with the optical axis or a direction parallel with the first direction for execution of the autofocus function.

The bobbin 110 may include a support groove 114 provided between an inner circumferential surface 110a and an outer circumferential surface 110b of the bobbin 110 so that the sensor substrate 180 may be disposed on the bobbin 110 by the support groove 114. Further, the sensor substrate 180 may be inserted into the bobbin 110 in the first direction (for example, the z-axis direction).

For example, the support groove 114 of the bobbin 110 may be provided between the inner circumferential surface 110a and the first and second protrusions 111 and 112 of the bobbin 110 so that the sensor substrate 180 may be inserted into the bobbin 110 in the first direction (the z-axis direction). Further, the support groove 114 may have any structure by which the sensor substrate 180 may be disposed on and/or fixed to the bobbin 110. For example, the support groove 114 may have the same shape as the sensor substrate 180, for example, a ring shape, but is not limited thereto.

Further, in another embodiment in which the sensor substrate 180 is omitted, the support groove 114 of the bobbin 110 may be omitted.

The bobbin 110 may include a receiving recess 116 suitable to receive the first position sensor 170 disposed on, coupled with or mounted on the sensor substrate 180.

Further, the receiving recess 116 of the bobbin 110 may be provided in a space between the first and second protrusions 111 and 112 of the bobbin 110 so that the first position sensor 170 mounted on the sensor substrate 180 may be inserted into the bobbin 110 in the first direction. In another embodiment in which the first position sensor 170 is fixed to or seated on the housing 140 not on the outer circumferential surface of the bobbin 170, the receiving recess 116 of the bobbin 110 may be omitted.

The bobbin 110 may include support projections coupled with and fixed to the lower elastic members 160 and provided on the lower surface of the bobbin 110.

If the lens moving apparatus 100 in accordance with the embodiment has a structure of executing a unidirectionally controlled autofocus function, a contact state between the lower surfaces of the first and second protrusions 111 and 112 of the bobbin 110 and bottom surfaces 146a of first load grooves 146 of the housing 140 may be set as an initial position.

For example, at the initial position, the bobbin 110 is raised when current is supplied to the first coil 120 and is lowered when current supply is cut off, thereby implementing the autofocus function.

Here, the initial position may be the primary position of a moving unit in a state in which power is not applied to the first coil 120, or be the position of the moving unit when the upper and lower elastic members 150 and 160 are elastically deformed only by the weight of the moving unit. Here, the moving unit may include the bobbin 110 and elements directly attached to the bobbin 110, for example, the sensor substrate 180 and the first coil 120.

On the other hand, if the lens moving apparatus 100 in accordance with the embodiment has a structure of executing a bidirectionally controlled autofocus function, a position in which the lower surfaces of the first and second protrusions 111 and 112 of the bobbin 110 and the bottom surfaces 146a of the first load grooves 146 of the housing 140 are spaced apart by a designated distance may be set as an initial position. In this case, at the initial position, an AF moving unit may be supported by the upper and lower elastic members 150 and 160.

For example, at the initial position, the bobbin 110 is may move upwards from the initial position when regular-directional current is applied to the first coil 120 and move downwards from the initial position when reverse-directional current is applied to the first coil 120.

Next, the first coil 120 will be described.

The first coil 120 is disposed on the outer circumferential surface of the bobbin 110. The first coil 120 may be disposed so as not to overlap the first position sensor 170 in a direction perpendicular to the optical axis.

For example, so as to inhibit interference or overlap between the first coil 120 and the first position sensor 170 in a direction perpendicular to the optical axis, the first position sensor 170 may be disposed on the upper part of the outer circumferential surface 110b of the bobbin 110 and the first coil 120 may be disposed on the lower part of the outer circumferential surface 110b of the bobbin 110.

In accordance with another embodiment, so as to inhibit interference or overlap between the first coil 120 and the first position sensor 170 in a direction perpendicular to the optical axis, the first position sensor 170 may be seated on or fixed to the housing 140 and the first coil 120 may be disposed on the outer circumferential surface 110b of the bobbin 110.

The first coil 120, as exemplarily shown in FIG. 3, may be wound on the outer circumferential surface 110b of the bobbin 110 in a direction of rotating about the optical axis.

For example, the first coil 120 may be wound directly on the outer circumferential surface 110b of the bobbin 110 or wound on a coil ring (not shown) provided on the outer circumferential surface 110b of the bobbin 110.

In accordance with another embodiment, the first coil 120 may be wound in advance and then inserted into the bobbin 110 and, for this purpose, a groove part into which the first coil 120 is inserted may be provided on the outer circumferential surface 110b of the bobbin 110. For example, the first coil 120 may be provided as an angled ring-shaped coil block.

The first coil 120 may be formed to have an almost octagonal shape, as exemplarily shown in FIG. 2. Such a shape of the first coil 120 may correspond to the shape of the outer circumferential surface 110b of the bobbin 110, but the first coil 120 is not limited thereto and may be formed to have a circular shape.

Further, at least four surfaces of the first coil 120 may be provided as flat surfaces and corners connecting these surfaces may be provided to have flat surfaces, without being limited thereto. That is, they are formed to have rounded surfaces.

The first coil 120 may have a surface corresponding to or opposite to the second magnets 130. Further, the second magnets 130 corresponding to the first coil 120 may have the same curvature as the curvature of the first coil 120.

For example, if the surface of the first coil 120 is a flat surface, the corresponding surfaces of the second magnets 130 may be flat surfaces and, if the surface of the first coil 120 is a curved surface, the corresponding surfaces of the second magnets 130 may be curved surfaces. Further, even if the surface of the first coil 120 is a curved surface, the corresponding surfaces of the second magnets 130 may be flat surfaces, and vice versa.

When current is supplied to the first coil 120, the first coil 120 may form electromagnetic force through interaction with the second magnets 130 and the formed electromagnetic force may move the bobbin 110 in the optical axis direction or the first direction parallel with the optical axis.

The second magnet 130 may be formed as a single body and thus the overall surface of the second magnet 130 opposite to the first coil 120 has the same polarity.

If the second magnet 130 is divided into two parts or four parts perpendicular to the optical axis and thus the surface of the second magnet 130 opposite to the first coil 120 is divided into two parts or four parts, the surface of the first coil 120 may be divided into parts in the same number as the number of divided parts of the second magnet 130.

Next, the first position sensor 170 and the sensor substrate 180 will be described.

The first position sensor 170 may be disposed on, coupled with or mounted on the bobbin 110 and move together with the bobbin 110. When the bobbin 110 moves in the first direction parallel with the optical axis, the first position sensor 170 may move together with the bobbin 110.

On the other hand, in another embodiment in which the first position sensor 170 is disposed on or fixed to the housing 140, when the bobbin 110 moves in the first direction parallel with the optical axis, the first position sensor 170 does not move together with the bobbin 110. In this case, the first magnet 190 to sense the first position sensor 170 may be disposed on and fixed to the bobbin 110 and move together with the bobbin 110.

The first position sensor 170 may sense the strength of a magnetic field of the first magnet 190 according to movement of the bobbin 110 and output a sensing signal as a result of sensing or a feedback signal. Displacement of the optical axis direction of the bobbin 110 or the first direction parallel with the optical axis may be adjusted using the sensing signal.

In another embodiment in which the first magnet 190 is omitted, the first position sensor 170 may sense the strength of a second magnetic field of the second magnets 130 according to movement of the bobbin 110 and output a sensing signal as a result of sensing.

The first position sensor 170 may be conductively connected to the sensor substrate 180 and be implemented as a driver type including a Hall sensor, or may be a single sensor, such as a Hall sensor.

The first position sensor 170 may be disposed on, coupled with or mounted on the bobbin 110 as various types, and the first position sensor 170 may receive current through various methods according to the disposed, combined or mounted types of the first position sensor 170.

The first position sensor 170 may be disposed on, coupled with or mounted on the sensor substrate 180 and the sensor substrate 180 may be coupled with the bobbin 110. For example, the first position sensor 170 may be indirectly disposed on, coupled with or mounted on the bobbin 110 through the sensor substrate 170.

The first position sensor 170 may be conductively connected to at least one of the upper elastic members 150 or the lower elastic members 160, which will be described later. For example, the first position sensor 170 may be conductively connected to the upper elastic members 150.

The sensor substrate 180 may be inserted into the support groove 114 of the bobbin 110 and thus coupled with the bobbin 110. The sensor substrate 180 may be sufficient to be mounted on the bobbin 110 and, although FIG. 3 exemplarily illustrates the sensor substrate 180 as having a ring shape, the disclosure is not limited thereto.

Further, the first position sensor 170 may be mounted on the sensor substrate 180 and supported by the sensor substrate 180 using an adhesive member, such as epoxy or a double-sided tape.

The sensor substrate 180 may include a body 182, elastic member contact parts 184-1 to 184-4 and circuit patterns L1 to L4.

For example, the body 182 of the sensor substrate 180 may have a shape which may be inserted into the support groove 114 of the bobbin 110 and fixed to the support groove 114.

The elastic member contact parts 184-1 to 184-4 of the sensor substrate 180 may protrude from the body 182 of the sensor substrate 180 and be connected to first inner frames 151 of the upper elastic members 150.

The circuit patterns L1 to L4 of the sensor substrate 180 may be formed on the body 182 of the sensor substrate 180 and conductively connect the elastic member contact parts 184-1 to 184-4 to the first position sensor 170.

The first position sensor 170 may be opposite to or aligned with the first magnet 190 disposed on the housing 140 at the initial position.

For example, at the initial position, at least a part of the first position sensor 170 may overlap the first magnet 190 in the second direction perpendicular to the optical axis, and may not overlap the second magnets 130. Further, if the first magnet 190 is omitted, the first position sensor 170 may be disposed so as to partially overlap the second magnets 130 at the initial position.

For example, the first position sensor 170 may be disposed such that a virtual horizontal line 172 (with reference to FIG. 6) passing through the center of the first position sensor 170 and being parallel with the second direction perpendicular to the optical axis is aligned with the center of the first magnet 190 at the initial position, but the disclosure is not limited thereto.

Here, the bobbin 110 may be raised and lowered in the first direction, i.e., the optical axis direction, based on a point where the virtual horizontal line 162 coincides with the center of the magnet 190, but the disclosure is not limited thereto.

That is, the center of the first position sensor 170 may be aligned with the center of the first magnet 190 in the second direction perpendicular to the optical axis at the initial position.

Further, in accordance with another embodiment, at least the center of the first position sensor 170 may not overlap the second magnet 130 in the second direction perpendicular to the optical axis at the initial position but the remainder of the first position sensor 170 except for the center of the first position sensor 170 may overlap the second magnet 130.

Further, in accordance with yet another embodiment, the center of the first position sensor 170 may not overlap the center of the second magnet 130 in the second direction perpendicular to the optical axis at the initial position but the remainder of the second magnet 130 except for the center of the second magnet 130 may overlap the center of the first position sensor 170.

Next, the housing 140 will be described.

The housing 140 supports the first magnet 190 for sensing and the second magnets 130 for driving, and receives the bobbin 110 therein so that the bobbin 110 may move in the first direction parallel with the optical axis.

The housing 140 may have a general hollow column shape. For example, the housing 140 may have a polyprism-shaped (for example, rectangular prism-shaped or octagonal prism-shaped) or circular hollowness 201.

Figure 4:
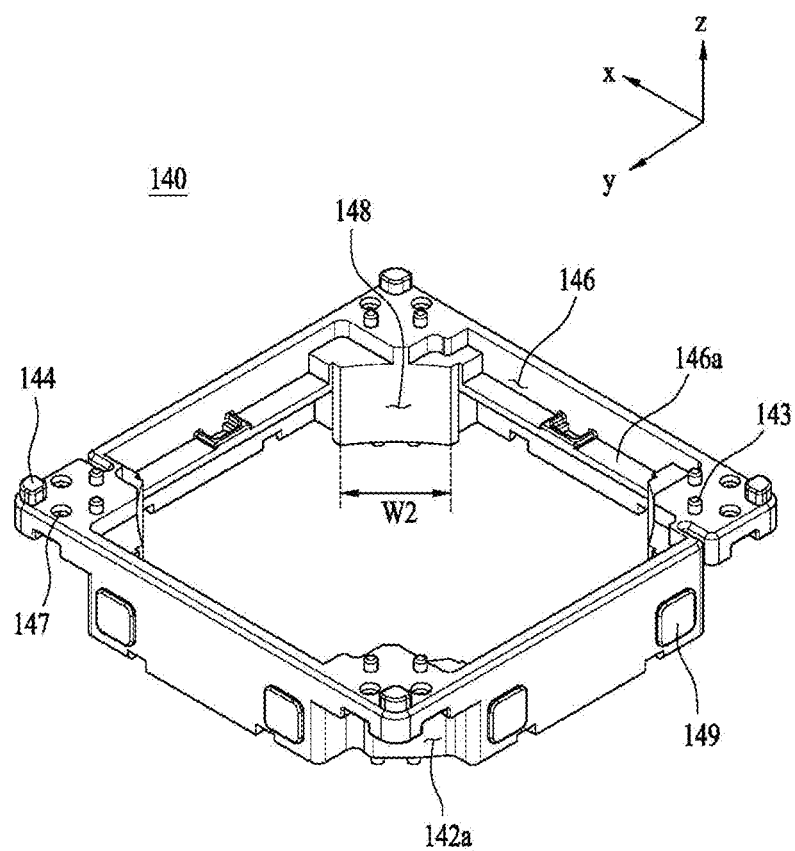
FIG. 4 is a perspective view of a housing shown in FIG. 1.
Figure 5:
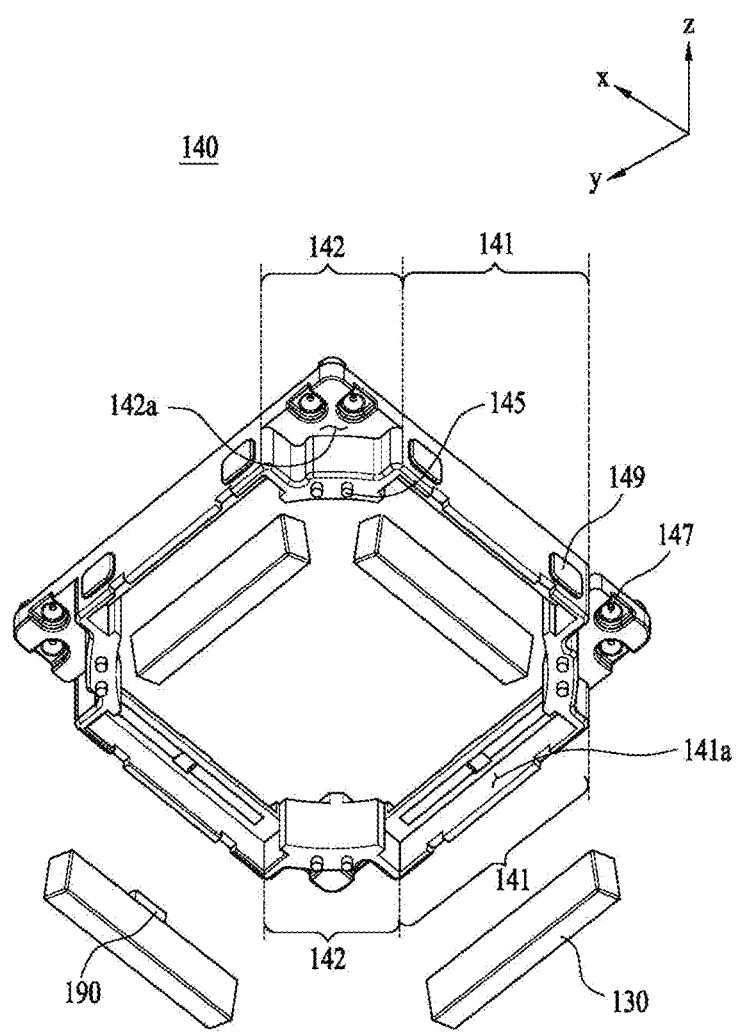
FIG. 5 is an exploded perspective bottom view of the housing and the second magnets shown in FIG. 1.
Figure 6:
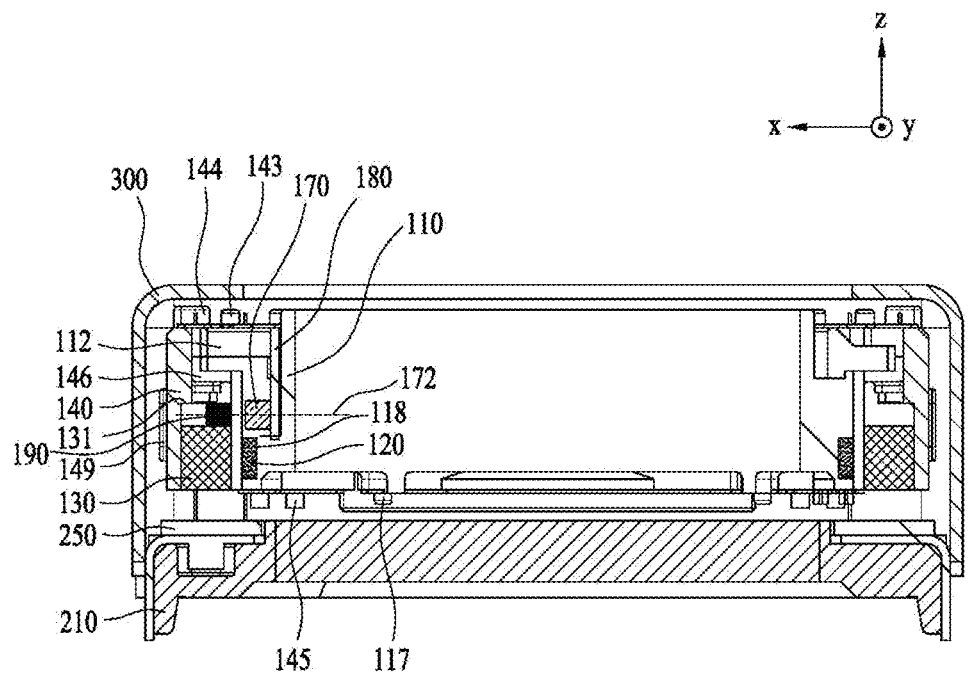
FIG. 6 is a cross-sectional view taken along line I-I' of FIG. 2.
Figure 7:
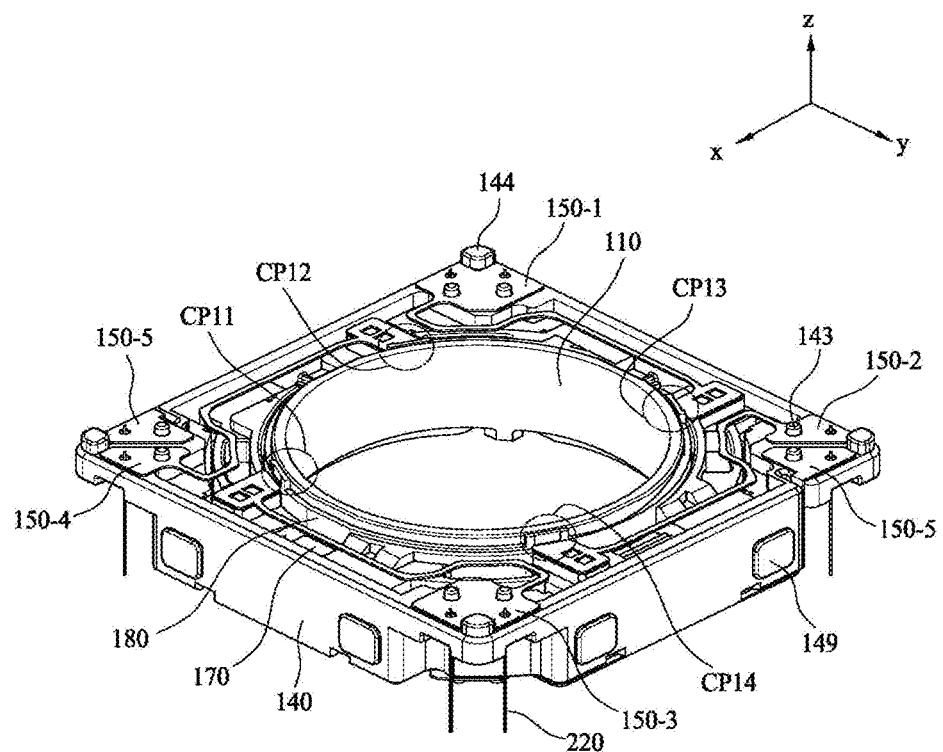
FIG. 7 is an assembled perspective view illustrating the bobbin, the housing, upper elastic members, the first position sensor, the sensor substrate and a plurality of support members shown in FIG. 1.
Figure 8:
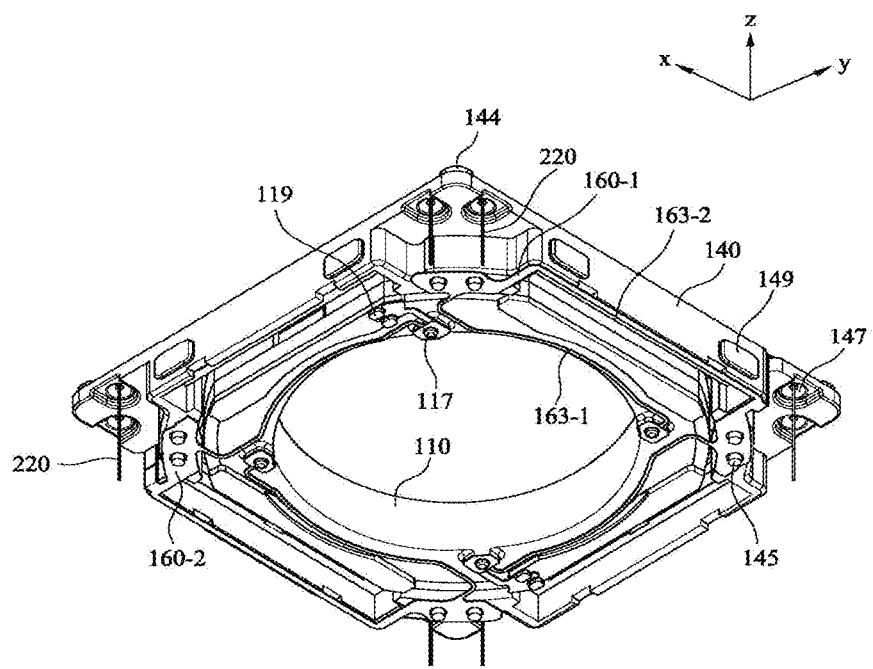
FIG. 8 is an assembled perspective bottom view illustrating the bobbin, the housing, lower elastic members and the support members shown in FIG. 1.

FIG. 4 is a perspective view of the housing 140 shown in FIG. 1, FIG. 5 is an exploded perspective bottom view of the housing 140 and the second magnets 130 shown in FIG. 1, FIG. 6 is a cross-sectional view taken along line I-I' of FIG. 2, FIG. 7 is an assembled perspective view illustrating the bobbin 110, the housing 140, the upper elastic members 150, the first position sensor 170, the sensor substrate 180 and the support members 220 shown in FIG. 1, and FIG. 8 is an assembled perspective bottom view illustrating the bobbin 110, the housing 140, the lower elastic members 160 and the support members 220 shown in FIG. 1.

The housing 140 may have the first load grooves 146 formed at positions corresponding to the first and second protrusions 111 and 112 of the bobbin 110.

The housing 140 may have third protrusions 148 corresponding to regions between the first and second protrusions 111 and 112 of the bobbin 110.

The surfaces of the third protrusions 148 of the housing 140 opposite to the bobbin 110 may have a shape which is equal to or corresponds to the shape of the side part of the bobbin 110. Here, a first width W1 of a region between the first and second protrusions 111 and 112 of the bobbin 110 shown in FIG. 3 and a second width W2 of the third protrusion 148 of the housing 140 shown in FIG. 4 may have a designated tolerance. Thereby, rotation of the third protrusion 148 of the housing 140 between the first and second protrusions 111 and 112 of the bobbin 110 may be regulated. Then, when force is applied to the bobbin 110 in a direction of rotating about the optical axis not in the optical axis direction, the third protrusions 148 of the housing 140 may inhibit rotation of the bobbin 110.

For example, the upper part of the outer surface of the housing 140 may have a rectangular shape but the lower part of the inner surface of the housing 140 may have an octagonal shape or a shape similar thereto, as exemplarily shown in FIGS. 4 and 5. The housing 140 may include a plurality of side parts and, for example, include four first side parts 141 and four second side parts 142.

The first side parts 141 of the housing 140 may correspond to parts where the second magnets 130 are installed. The second side parts 142 of the housing 140 may be located between two neighboring first side parts 141 and correspond to parts where the support members 220 may be disposed. The first side parts 141 of the housing 140 may interconnect the second side parts 142 of the housing 140 and include plan surfaces having a designated depth.

Each of the first side parts 141 of the housing 140 may have an area, which is equal to or greater than the area of the corresponding second magnet 130, and a length, which is equal to or greater than the length of the corresponding second magnet 130.

The housing may have magnet load parts 141a provided on the inner surfaces of the first side parts 141 so as to receive the first magnet 190 and the second magnets 130-1 to 130-4.

The respective second magnets 130-1, 130-2, 130-3 and 130-4 may be fixed to the magnet load parts 141a provided on the corresponding first side parts 141 of the housing 140.

The magnet load part 141a of the housing 140 may be formed as a groove corresponding to the size of the second magnet 130 and the second magnet 130 may be disposed in the magnet load part 141a such that at least three surfaces of the second magnet 130, i.e., both side surfaces and the upper surface of the second magnet 130, may be opposite to those of the magnet load part 141a.

An opening may be formed on the bottom surface of the magnet load part 141a of the housing 140, i.e., the surface of the magnet load part 141a opposite to the second coil 230, which will be described later, and the bottom surface of the second magnet 130 fixed to the magnet load part 141a may be directly opposite to the second coils 230.

The first magnet 190 may be disposed so as to be opposite to the first position sensor 170 in the second direction perpendicular to the optical axis. For example, the first magnet 190 may be disposed on any one of the first side parts 141 of the housing 140 and the first position sensor 170 may be disposed on any one of first side surfaces of the bobbin 110, corresponding to the first side part 141 of the housing 140 on which the magnet 190 is disposed.

For example, the first magnet 190 may be fixed to the magnet load part 141a of the housing 140 so as to be disposed on the second magnet 130.

For example, the first magnet 190 may be disposed on any one of the second magnets 130-1 to 130-4 (for example, the second magnet 130-1).

The first magnet 190 may contact any one second magnet (for example, the second magnet 130-1), but the disclosure is not limited thereto.

In another embodiment, the first magnet 190 may be spaced apart from the second magnet (for example, the second magnet 130-1) and, for this purpose, the housing 140 may have a separate magnet load part (not shown) to receive the second magnet (for example, the second magnet 130-1) spaced apart from the first magnet 190. That is, a part of the housing 140 may be disposed between the first magnet 190 and the second magnet (for example, the second magnet 130-1). Further, in accordance with yet another embodiment, the first magnet 190 may be omitted and the second magnets 130 may execute both sensing and driving functions.

The first side parts 141 of the housing 140 may be disposed parallel with the side surfaces of the cover member 300. Further, the first side parts 141 of the housing 140 may have a greater surface than the second side parts 142. The second side parts 142 of the housing 140 may form paths through which the support members 220 pass. The upper surfaces of the second side parts 142 of the housing 140 may include first through holes 147. The support members 220 may pass through the first through holes 147 and be connected to the upper elastic members 150.

Further, in order to inhibit collision directly with the inner surface of the cover member 300 shown in FIG. 1, second stoppers 144 may be provided at the upper end of the housing 140. The housing 140 may have at least one first upper support projection 143 formed on the upper surface thereof so as to be coupled with the upper elastic members 150.

For example, the first upper support projections 143 may be formed on the upper surfaces of the second side parts 142 of the housing 140. The first upper support projections 143 of the housing 140 may have a semispherical shape, as exemplarily shown in the drawings, or have a cylindrical shape or a polygonal prism shape, but the disclosure is not limited thereto.

The housing 140 may have support projections 145 formed on the lower surface thereof so as to be coupled with and fixed to the lower elastic members 160.

In order to secure spaces filled with gel-type silicone serving to execute a damping function as well as to form paths through which the support members 220 pass, the housing 140 may have first recesses 142a formed on the second side parts 142. That is, the first recesses 142a of the housing 140 may be filled with damping silicone.

The housing 140 may have a plurality of third stoppers 149 protruding from the side surface thereof. The third stoppers 149 serve to inhibit collision of the housing 140 with the cover member 300 when the housing 140 moves in the second and third directions.

In order to inhibit collision of the bottom surface of the housing 140 with the base 210 and/or the circuit board 250, which will be described later, the housing 140 may have fourth stoppers (not shown) protruding from the lower surface thereof. Through such a configuration, the housing 140 may be spaced apart from the base 210 in the downward direction and spaced apart from the cover member 300 in the upward direction and thus maintain a height in the optical axis direction without interference in the upward and downward directions. Therefore, the housing 140 may execute shifting operation in which the housing 140 moves in the forward, backward, leftward and rightward directions, i.e., in the second and/or third direction on a plane perpendicular to the optical axis.

Next, the first magnet 190 and the second magnets 130 will be described.

The second magnets 130 may be disposed in the housing 140 so as to correspond to the first coil 120. The second magnets 130 may be received within and supported by the first side parts 141 of the housing 140, as exemplarily shown in FIG. 5.

For example, with reference to FIG. 5, the second magnets 130 may be disposed in the magnet load parts 141a of the housing 140 so as to overlap the first coil 120 in a direction perpendicular to the optical axis.

The first and second magnets 190 and 130 may be received in the first side parts 141 of the housing 140, but the disclosure is not limited thereto.

In another embodiment, the first and second magnets 190 and 130 may be disposed outside the first side parts 141 of the housing 140 or disposed inside or outside the second side parts 142 of the housing 140.

Further, in accordance with yet another embodiment, the first magnet 190 may be received in the first side part 141 of the housing 140 and the second magnets 190 may be disposed outside the first side parts 141 of the housing 140, and vice versa.

Further, in accordance with a further embodiment, the first magnet 190 may be received inside or disposed outside the first side part 141 of the housing 140 and the second magnets 130 may be received inside or disposed outside the second side parts 142 of the housing 140, and vice versa.

The second magnets 130 may have a shape corresponding to the shape of the first side parts 141 of the housing 140, i.e., an approximately rectangular parallelepiped shape, and the surfaces of the second magnets 130 opposite to the first coil 120 may have a curvature corresponding to the curvature of the corresponding surface of the first coil 120.

The second magnet 130 may be formed as one body such that the surface of the second magnet 130 opposite to the first coil 120 forms an S pole 132 and the outer surface of the second magnet 130 forms an N pole 134. However, the disclosure is not limited thereto, and vice versa.

At least two second magnets 130 may be installed and, in the embodiment, four second magnets 130 are installed. Here, the second magnets 130 may have an approximately rectangular cross-section, but the disclosure is not limited thereto. In another embodiment, the second magnets 130 may have a triangular or diamond-shaped cross-section.

With reference to FIG. 3, if the second magnets 130 have a rectangular cross-section, a pair of second magnets 130-1 and 130-3 out of the second magnets 130-1 to 130-4 may be disposed in parallel in the second direction and another pair of second magnets 130-2 and 130-4 may be disposed in parallel in the third direction. Through such a disposition structure, movement of the housing 140 for compensating for handshake, which will be described later, may be controlled.

The first magnet 190 may be disposed in the housing 140 so as to overlap at least a part of the first position sensor 170 in the second direction perpendicular to the optical axis. For example, the first magnet 190 together with the second magnet (for example, the second magnet 130-1) may be received in and supported by the first side part 141 of the housing 140.

The second magnets 130 may be monopole magnetized magnets in which different poles are formed at inner and outer parts thereof. The second magnets 130 may be disposed such that the surface of the second magnet 130 opposite to the first coil 120 may form an S pole 132 and the other surface of the second magnet 130 may form an N pole 134. However, the disclosure is not limited thereto, and vice versa.

The first magnet 190 may be installed in the housing 140 so as to be located on the second magnet 130. The first magnet 190 may be a monopole magnetized magnet in which different poles are formed at upper and lower parts thereof. For example, the interface between the S pole and the N pole of the first magnet 190 may be vertical to the interface between the S pole and the N pole of the second magnet 130, but the disclosure is not limited thereto. The size of the first magnet 190 may be less than the size of the second magnet 130, but the disclosure is not limited thereto.

In another embodiment, the first magnet 190 may be a dipole magnetized magnet in which different poles are formed at upper and lower parts thereof. The first magnet 190 may be a ferrite, alnico, or rare earth element magnet and be classified into a P-type or an F-type according to types of a magnetic circuit. In the embodiment, kinds of dipole magnetized elements are not limited.

The first magnet 190 implemented as a dipole magnetized magnet may include a first sensing magnet, a second sensing magnet and a non-magnetic diaphragm.

The first sensing magnet and the second sensing magnet may be spaced apart from each other so as to be opposite to each other in a direction parallel with the optical axis, and the non-magnetic diaphragm may be disposed between the first sensing magnet and the second sensing magnet.

In another embodiment, the first sensing magnet and the second sensing magnet may be spaced apart from each other so as to be opposite to each other in a direction perpendicular to the optical axis, and the non-magnetic diaphragm may be disposed between the first sensing magnet and the second sensing magnet.

The non-magnetic diaphragm is a part which does not substantially have magnetic force and may include a section having little polarity. The non-magnetic diaphragm may be filled with air or include a non-magnetic material.

The moving unit of the lens moving apparatus 100 may move in the +z-axis direction or −z-axis direction from the initial position. At the initial position, the moving unit may be separated from a stationary unit by the upper and lower elastic members 150 and 160. For example, the stationary unit may include the housing 140 and elements directly attached to the housing 140, for example, the first and second magnets 190 and 130.

The center of the first position sensor 170 at the initial position may be aligned so as to be opposite to the non-magnetic diaphragm of the first magnet 190 in a direction perpendicular to the optical axis, but the disclosure is not limited thereto. Thereby, when the moving unit moves in a direction parallel with the optical axis, the first position sensor 170 may sense a section in which the magnetic field strength of the first magnet 190 is linearly changed.

According to kinds of the first magnet 190, the center of the first position sensor 170 may be aligned so as to be opposite to any one of the first sensing magnet, the second sensing magnet and the non-magnetic diaphragm in a direction perpendicular to the optical axis.

Next, the upper elastic members 150, the lower elastic members 160 and the support members 220 will be described.

The upper elastic members 150 and the lower elastic members 160 may support the bobbin 110 by elasticity. For example, the upper elastic members 150 may be coupled with the upper end of the bobbin 110 and the upper end of the housing 140 and the lower elastic members 160 may be coupled with the lower end of the bobbin 110 and the lower end of the housing 140.

The support members 220 may support the housing 140 so as to be movable with respect to the base 210 in a direction perpendicular to the optical axis and conductively connect at least one of the upper and lower elastic members 150 to the circuit board 250.

Figure 9:
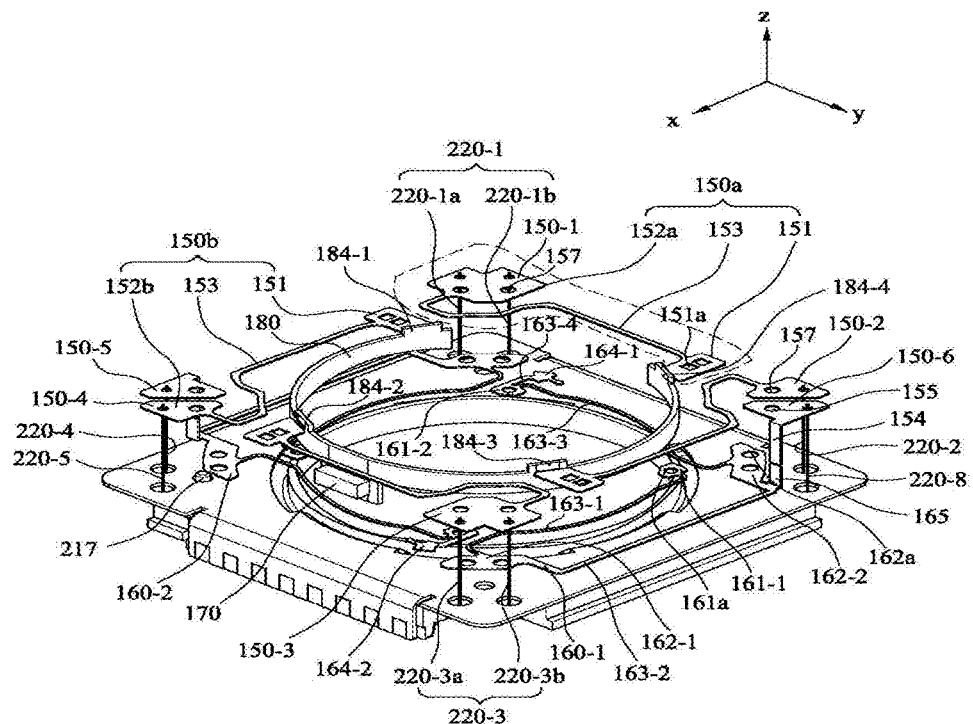
FIG. 9 is an assembled perspective view of the upper elastic members, the lower elastic members, the first position sensor, the sensor substrate, a base, the support members and a circuit board shown in FIG. 1.

FIG. 9 is an assembled perspective view of the upper elastic members 150, the lower elastic members 160, the first position sensor 170, the sensor substrate 180, the base 210, the support members 220 and the circuit board 250 shown in FIG. 1.

The upper elastic members 150 may include a plurality of upper elastic members 150-1 to 150-4, conductively separated from each other.

The elastic member contact parts 184-1 to 184-4 may be conductively connected to at least one of the upper elastic members 150 and the lower elastic members 160.

Although FIG. 9 exemplarily illustrates the elastic member contact parts 184-1 to 184-4 of the sensor substrate 180 as conductively contacting the upper elastic member parts 150-1 to 150-4, the disclosure is not limited thereto.

In another embodiment, the elastic member contact parts 184-1 to 184-4 of the sensor substrate 180 may conductively contact the lower elastic members 160 or conductively contact both the upper elastic members 150 and the lower elastic members 160.

Each of the elastic member contact parts 184-1 to 184-4 conductively connected to the first position sensor 170 may be conductively connected to a corresponding one of the upper elastic member parts 150-1 to 150-4. Further, each of the upper elastic member parts 150-1 to 150-4 may be conductively connected to a corresponding one of the support members 220.

Each 150a or 150b of the first to fourth upper elastic member parts 150-1 to 150-4 may include a first inner frame 151 coupled with the bobbin 110, a 1-1$^{st}$ outer frame 152a or 152b coupled with the housing 140, and a first frame connection part 153 connecting the first inner frame 151 and the 1-1$^{st}$ outer frame 152a or 152b.

The first frame 151 of each of the first to fourth upper elastic member parts 150-1 to 150-4 may be coupled with the bobbin 110 and a corresponding one of the elastic member contact parts 184-1 to 184-4.

As exemplarily shown in FIG. 3, if upper surfaces 112a of the second protrusions 112 of the bobbin 110 are flat, the first inner frames 151 may be placed on the upper surfaces 112a of the second protrusions 112 of the bobbin 110 and then fixed using adhesive members.

In another embodiment, differently from FIG. 3, if support projections (not shown) are formed on the upper surfaces 112a, the support protrusions may be inserted into through holes 151a formed on the first inner frames 151 and then fixed through thermal fusion or using adhesive members, such as epoxy.

The 1-1$^{st}$ outer frame 152a or 152b may be coupled with the housing 140 and connected to the support member 220.

The first frame connection part 153 may connect the first inner frame 151 and the 1-1$^{st}$ outer frame 152a or 152b.

Although the 1-1$^{st}$ outer frame 152b has the same shape as any one of two parts acquired by dividing the 1-1$^{st}$ outer frame 152a, the disclosure is not limited thereto. In another embodiment, the 1-1$^{st}$ outer frame 152a may be divided into two parts, and the two parts may have the same shape as the 1-1$^{st}$ outer frame 152b and be bilaterally symmetrically disposed.

The first frame connection part 153 may be bent at least once and form a pattern having a designated shape. Through position change and fine deformation of the first frame connection parts 153, raising and/or lowering operation of the bobbin 110 in the first direction parallel with the optical axis may be flexibly supported.

The first upper support projections 143 of the housing 140 may couple and fix the 1-1$^{st}$ outer frames 152a and 152b of the upper elastic members 150, exemplarily shown in FIG. 9, with and to the housing 140.

In accordance with the embodiment, through holes 157 coupled with the first upper support projections 143 of the housing 140 may be formed on the 1-1$^{st}$ outer frames 152a and 152b. The first upper support projections 143 of the housing 140 and the through holes 157 may be fixed through thermal fusion or using adhesive members, such as epoxy.

After the first inner frames 151 are coupled with the bobbin 110 and the 1-1$^{st}$ outer frames 152a and 152b are coupled with the housing 140, power, for example, power of different polarities may be applied to two pins among four pins of the first position sensor 170 and sensing signals from the two remaining pins may be output by executing conductive connection CP11, CP12, CP13 and CP14, such as soldering, between the elastic member contact parts 184-1 to 184-4 of the sensor substrate 180 and the first inner frames 151, as exemplarily shown in FIG. 7. For example, in order to receive power of different polarities and to output sensing signals of different polarities, the upper elastic members 150 include four upper elastic members, i.e., the first to fourth upper elastic member parts 150-1 to 150-4.

The first to fourth upper elastic member parts 150-1 to 150-4 may be connected to the circuit board 250 through the support members 220.

For example, the first upper elastic member part 150-1 may be connected to the circuit board 250 through at least one of 1-1$^{st}$ and 1-2$^{nd}$ support members 220-1a and 220-1b, the second upper elastic member part 150-2 may be connected to the circuit board 250 through a second support member 220-2, the third upper elastic member part 150-3 may be connected to the circuit board 250 through at least one of 3-1$^{st}$ and 3-2$^{nd}$ support members 220-3a and 220-3b, and the fourth upper elastic member part 150-4 may be connected to the circuit board 250 through a fourth support member 220-4. Therefore, the first position sensor 170 may receive power supplied from the circuit board 250 or provide a sensing signal output from the first position sensor 170 to the circuit board 250 through the support members 220 and the upper elastic members 150.

The lower elastic members 160 may include first and second lower elastic member parts 160-1 and 160-2, conductively separated from each other. The first coil 120 may be connected to the support members 220 through the first and second lower elastic member parts 160-1 and 160-2.

Each of the first and second lower elastic member parts 160-1 and 160-2 may include one or more second inner frames 161-1 and 161-2, one or more second outer frames 162-1 and 162-2, and one or more second frame connection parts 163-1, 163-2 and 163-3.

The second inner frames 161-1 and 161-2 may be coupled with the bobbin 110 and the second outer frames 162-1 and 162-2 may be coupled with the housing 140.

The 2-1$^{st}$ frame connection part 163-1 may connect the second inner frame 161-1 and the second outer frame 162-1, the 2-2$^{nd}$ frame connection part 163-2 may connect the two second outer frames 162-1 and 162-2, and the 2-3$^{rd}$ frame connection part 163-3 may connect the second inner frame 161-2 and the second outer frame 162-2.

Further, the first lower elastic member part 160-1 may further include a first coil frame 164-1 and the second lower elastic member part 160-2 may further include a second coil frame 164-2.

With reference to FIG. 9, both ends of the first coil 120 may be conductively connected to the first and second coil frames 164-1 and 164-2 by a conductive connection member, such as solder.

The first and second lower elastic member parts 160-1 and 160-2 may receive power, for example, power of different polarities, and transmit the received power to the first coil 120. For example, in order to receive power of different polarities and to transmit the received power to the first coil 120, the lower elastic members 160 may include two lower elastic members, i.e., the first and second lower elastic member parts 160-1 and 160-2.

Further, each of the first and second lower elastic member parts 160-1 and 160-2 may further include a 2-4$^{th}$ frame connection part 163-4. The 2-4$^{th}$ frame connection parts 163-4 may connect the coil frame 164 and the second inner frame 161-2.

At least one of the 2-1$^{st}$ to 2-4$^{th}$ frame connection parts 163-1, 163-2, 163-3 and 163-4 may be bent at least once and form a pattern having a designated shape. Particularly, through position change and fine deformation of the 2-1$^{st}$ and 2-3$^{rd}$ frame connection parts 163-1 and 163-3, raising and/or lowering operation of the bobbin 110 in the first direction parallel with the optical axis may be flexibly supported.

In accordance with one embodiment, each of the first and second lower elastic member parts 160-1 and 160-2 may further include a bent part 165.

The bent parts 165 of the first and second lower elastic member parts 160-1 and 160-2 may be bent from the 2-2$^{nd}$ frame connection parts 163-2 towards the upper elastic members 150 in the first direction.

The upper elastic members 150 may further include fifth and sixth upper elastic member parts 150-5 and 150-6, conductively separated from each other. The first to sixth upper elastic member parts 150-1 to 150-6 may be conductively separated from each other.

Each of the fifth and sixth upper elastic member parts 150-5 and 150-6 may include a connection frame 154 and a 1-2$^{nd}$ outer frame 155. The connection frames 154 of the fifth and sixth upper elastic member parts 150-5 and 150-6 may extend in the first direction and be connected to the bent parts 165 of the lower elastic member parts 160-1 and 160-2.

The 1-2$^{nd}$ outer frame 155 may be bent from the connection frame 154 in a direction perpendicular to the first direction, coupled with the housing 140 and connected to the support member 220.

For example, the fifth upper elastic member 150-5 may be connected to the fifth support member 220-5 and the sixth upper elastic member 150-6 may be connected to the sixth support member 220-6. Here, the bent parts 165 of the first and second lower elastic member parts 160-1 and 160-2 and the connection frames 154 and the 1-2$^{nd}$ outer frames 155 of the fifth and sixth upper elastic member parts 150-5 and 150-6 may be integrally formed. As described above, each of the first and second lower elastic member parts 160-1 and 160-2 and each of the fifth and sixth upper elastic member parts 150-5 and 150-6 may have a part 165 or 154 which is bent in the first direction.

In the same manner as the 1-1$^{st}$ outer frames 152b, the 1-2$^{nd}$ outer frames 155 may include through holes.

In accordance with one embodiment, the 1-1$^{st}$ outer frames 152b of the first to sixth upper elastic member parts 150-1 to 150-6 may be disposed so as to be opposite to one another in the diagonal direction and the 1-2$^{nd}$ outer frames 155 may be disposed so as to be opposite to each other in the diagonal direction.

It may be understood that the first and second lower elastic member parts 160-1 and 160-2 receive power from the circuit board 250 through the fifth and sixth upper elastic member parts 150-5 and 150-6 connected to the support members 220 and provide the received power to the first coil 120. That is, the first lower elastic member part 160-1 may be connected to the circuit board 250 through the sixth upper elastic member part 160-6 and the sixth support member 220-6 and the second lower elastic member part 160-2 may be connected to the circuit board 250 through the fifth upper elastic member part 160-5 and the fifth support member 220-5.

Although the embodiment describes the upper and lower elastic members 150 and 160 as being divided into a plurality of upper and lower elastic members, in another embodiment, the upper and lower elastic members 150 and 160 may not be divided.

First lower support projections of the bobbin 110 may couple and fix the second inner frames 161-1 and 161-2 of the lower elastic members 160 with and to the bobbin 110. The second support projections 145 of the housing 140 may couple and fix the second outer frames 162-1 and 162-2 of the lower elastic members 160 with and to the housing 140.

With reference to FIG. 9, through holes 161a coupled with the first lower support projections of the bobbin 110 may be formed on the second inner frames 161-1 and 161-2 of the first and second lower elastic member parts 160-1 and 160-2. Here, the first lower support projections of the bobbin 110 and the through holes 161a may be fixed through thermal fusion or using adhesive members, such as epoxy.

Further, through holes 162a coupled with the second lower support projections 145 of the housing 140 may be formed on the second outer frames 162-1 and 121-2 of the first and second lower elastic member parts 160-1 and 160-2. Here, the second lower support projections 145 of the housing 140 and the through holes 162a may be fixed through thermal fusion or using adhesive members, such as epoxy.

The above-described upper elastic members 150 and lower elastic members 160 may be provided as leaf springs, but the disclosure is not limited as to the material of the upper and lower elastic members 150 and 160.

Power may be supplied to the first position sensor 170 using the two conductively separated upper elastic members 150, a sensing signal output from the first position sensor 170 may be transmitted to the circuit board 250 using the other two conductively separated upper elastic members 150, and power may be supplied to the first coil 120 using the two conductively separated lower elastic members 160. However, the disclosure is not limited thereto.

In another embodiment, the function of the upper elastic members 150 and the function of the lower elastic members 160 may be exchanged. That is, power may be supplied to the first coil 120 using two conductively separated upper elastic members, power may be supplied to the first position sensor 170 using two conductively separated lower elastic members, and a sensing signal output from the first position sensor 170 may be transmitted to the circuit board 250 using other two conductively separated lower elastic members. Although such a structure is not shown, it may be apparent through the above-described drawings.

The support members 220 may be respectively disposed on the second side parts 142 of the housing 140. For example, two support members 220 may be disposed on each of the four second side parts 142.

Otherwise, among the four second side parts 142 of the housing 140, one support member 220 may be disposed on each of two second side parts 142 and two support members 220 may be disposed on each of the two remaining second side parts 142.

Further, in another embodiment, the support members 220 may be leaf springs disposed on the first side parts 141 of the housing 140.

The support members 220 may form paths for transmitting power required by the first position sensor 170 and the first coil 120 and form paths for providing a sensing signal output from the first position sensor 170 to the circuit board 250, as described above.

The support members 220 may be implemented as elastic support members, for example, leaf springs, coil springs, wire springs or suspension wires. Further, in another embodiment, the support members 220 may be formed integrally with the upper elastic members 150.

Next, the base 210, the circuit board 250, the second coils 230 and the second position sensors 240 will be described.

The base 210 may have a hollowness corresponding to the hollowness of the bobbin 110 and/or the hollowness of the housing 140 and have a shape coinciding with or corresponding to the shape of the cover member 300, for example, a rectangular shape.

Figure 10:
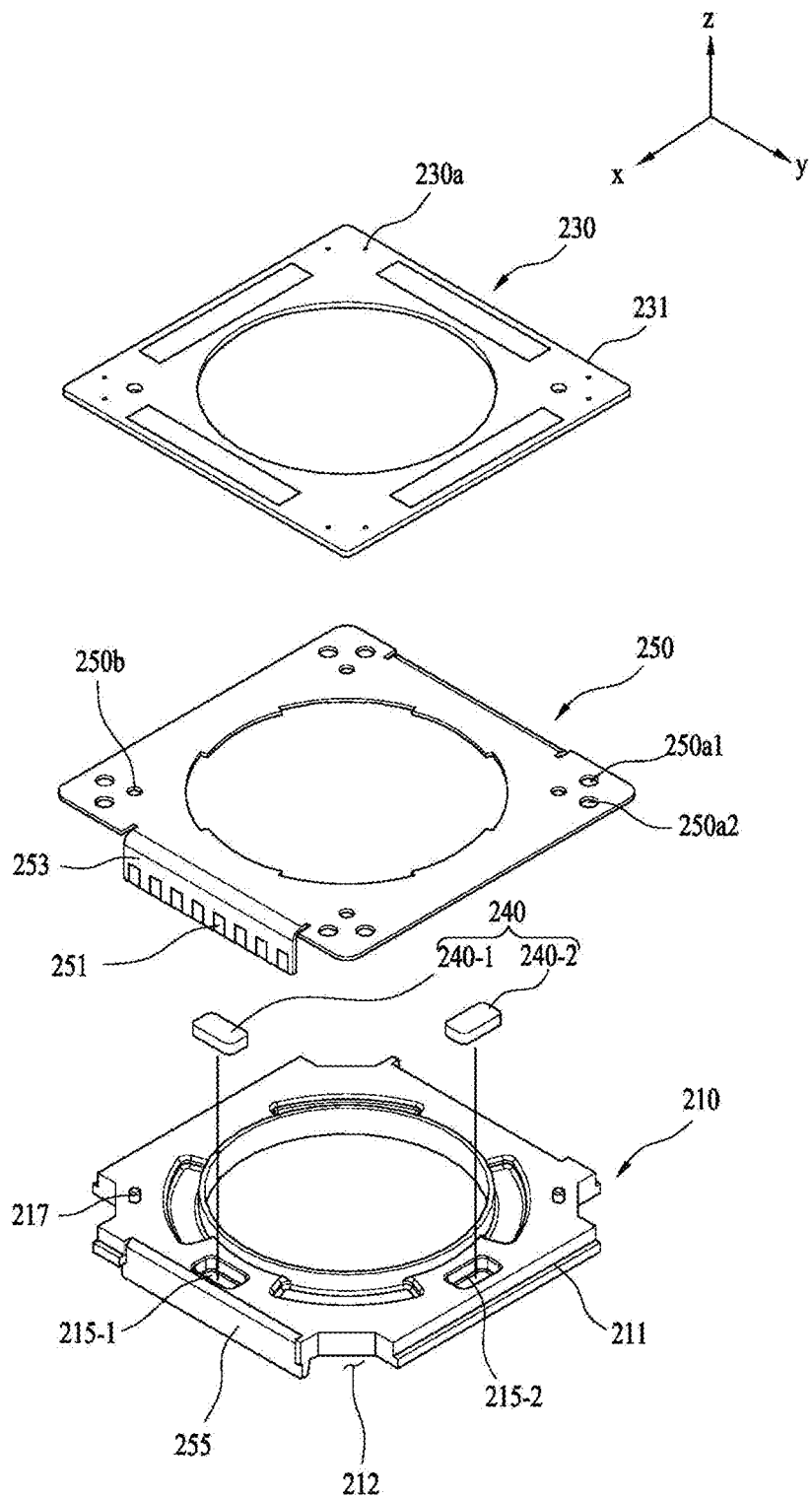
FIG. 10 is an exploded perspective view of the base, second coils, second position sensors and the circuit board shown in FIG. 1.

FIG. 10 is an exploded perspective view of the base 210, the second coils 230, the second position sensors 240 and the circuit board 250 shown in FIG. 1.

The base 210 may include a staircase 211 which may be coated with an adhesive when the cover member 300 is attached to the base 210. Here, the staircase 211 may guide the cover member 300 coupled with the upper part thereof and the distal end of the cover member 30 may be in surface contact with the staircase 211.

The staircase 211 of the base 210 and the distal end of the cover member 300 may be fixed and sealed by an adhesive, etc.

The base 210 may be spaced apart from the first lens driving unit by a designated distance. A support part 255 having a size corresponding to a region of the circuit board 250 having terminals 251 may be formed on the surface of the base 210 opposite to the terminals 251 of the circuit board 250. The support part 255 may be formed on the outer surface of the base 210 without the staircase 211 and support a terminal surface 253 on which the terminals 251 are formed.

The corners of the base 210 may have second recesses 212. If the corners of the cover member 300 have a protruding shape, such protrusions of the cover member 300 may be coupled with the second recesses 212 of the base 210.

Further, second load recesses 215-1 and 215-2 in which the second position sensors 240 may be disposed may be provided on the upper surface of the base 210.

In accordance with the embodiment, the number of the second position sensors 240 may be two and, thus, two second load recesses 215-1 and 215-2 may be provided. Each of the two second position sensors 240-1 and 240-2 may be disposed in a corresponding one of the second load recesses 215-1 and 215-2, and the second position sensors 240-1 and 240-2 may sense degrees of movement of the housing 140 in the second direction and third direction. An angle formed by virtual lines connecting the respective second load recesses 215-1 and 215-2 and the center of the base 210 may form a right angle, but the disclosure is not limited thereto.

Further, a load part (not shown) in which a filter is installed may be formed on the lower surface of the base 210. Such a filter may be an IR cut-off filter. However, the disclosure is not limited thereto and the filter may be disposed on a sensor holder separately provided under the base 210. Further, although it will be described later, the circuit board 250 on which an image sensor is mounted may be disposed on the lower surface of the base 210 and the camera module may include the lens moving apparatus 100 in accordance with the embodiment and the circuit board 250 on which the image sensor is mounted.

The second coils 230 may be disposed on the circuit board 250 and the second position sensors 240 may be disposed under the circuit board 250. The second position sensors 240 may sense displacement of the housing 140 with respect to the base 210 in a direction perpendicular to the optical axis.

The second position sensors 240 may include two sensors 240-1 and 240-2 which are disposed perpendicular to each other so as to sense displacement of the housing 140 in directions perpendicular to the optical axis (the x-axis direction and/or the y-axis direction).

The second position sensors 240, the second coils 230 and the second magnets 130 may be disposed so as to be aligned with the same axis, but the disclosure is not limited thereto.

The circuit board 250 may be disposed on the upper surface of the base 210 and have a hollowness corresponding to the hollowness of the bobbin 110, the hollowness of the housing 140, and/or the hollowness of the base 210. The circuit board 250 may have a shape coinciding with or corresponding to the shape of the upper surface of the base 210, for example, a rectangular shape.

The circuit board 250 may have at least one terminal surface 253 bent from the upper surface of the circuit board 250 such that a plurality of terminals 251 or pins receiving electrical signals from the outside is formed on the terminal surface 253.

The second coils 230 may include through holes 230a passing through corner parts of a circuit member 231. The support members 220 may pass through the through holes 230a of the circuit member 231 and be connected to the circuit board 250.

The second coils 230 may be disposed on the circuit board 250 so as to be opposite to the second magnets 130 fixed to the housing 140.

Although FIG. 10 illustrates the second coils 230 as being formed on the circuit member 231 provided separately from the circuit board 250, the disclosure is not limited thereto and, in accordance with another embodiment, the second coils 230 may be implemented using a circuit pattern formed on the circuit board 250.

Four second coils 230 may be installed on the circuit member 231, but the disclosure is not limited thereto. That is, only two second coils including one second coil for the second direction and one second coil for the third direction may be installed, or four or more second coils may be installed.

Otherwise, the second coils 230 may be formed by winding a wire into a donut shape or formed into a fine pattern (FP) coil shape and then be conductively connected to the circuit board 250.

As described above, the housing 140 may move in the second direction and/or third direction by interaction between the second magnets 130 and the second coils 230 disposed opposite to each other, thus executing handshake compensation.

The second position sensors 240 may include a first sensor 240-1 to sense displacement of the first lens moving unit in the x-axis direction perpendicular to the optical axis (z-axis), and a second sensor 240-2 to sense displacement of the first lens moving unit in the y-axis direction.

The second position sensors 240 may be disposed so as to be aligned with the center of the second coils 230 across the circuit board 250, but the disclosure is not limited thereto.

Although the second position sensors 240 may be Hall sensors, any sensor which may sense the strength of a magnetic field may be used as the second position sensors 240.

The circuit board 250 may include connector areas 250a1 and 250a2 which may be coupled with the support members 220. The support members 220 may be coupled with the connector areas 250a1 and 250a2 of the circuit board 250 through soldering and thus conductively connected to a circuit pattern formed on the circuit board 250. For example, the connector areas 250a1 and 250a2 are formed as through holes passing through the circuit board 250, but limited to therein. In another embodiment, the connector areas 250a1 and 250a2 are formed as connection pads not passing through the circuit board 250.

The circuit board 250 may further include through holes 250b coupled with second upper support projections 217 of the base 210. The circuit board 250 may further include the terminals 251. The terminal surface 253 may be formed on the circuit board 250 by bending. One or more terminals 251 may be installed on the terminal surface 253 of the circuit board 250.

In accordance with the embodiment, the circuit board 250 may receive external power, supply the received power to the first and second coils 120 and 230 and the first and second sensors 170 and 240, and output a sensing signal output from the first position sensor 170 and output from the second position sensors 240 to the outside, through the terminals 251 installed on the terminal surface 253. The number of the terminals 251 formed on the terminal surface 253 may be increased or decreased according to kinds of elements, control of which is required, and the number of these elements.

In accordance with the embodiment, the circuit board 259 may be an FPCB, but the disclosure is not limited thereto. The terminals 251 formed on the circuit board 250 may be formed directly on the surface of the base 210.

As described above, the circuit board 250 may supply power (or current) required by the first and second coils 120 and 230 and the first position sensor 170 and transmit the sensing signal from the first position sensor 170 and output from the second position sensors 240 to a controller of the camera module.

The lens moving apparatus in accordance with the above-described embodiment may be used in various fields, for example, camera modules. For example, camera modules may be applied to mobile devices, such as a portable terminal.

The camera module in accordance with the embodiment may include a lens barrel coupled with the bobbin 110, an image sensor (not shown), an image sensor substrate which may be connected to the circuit board 250 and have the image sensor, and an optical system. The camera module in accordance with the embodiment may further include an IR cut-off filter (not shown) serving to cut off light of an infrared wavelength range incident on the image sensor.

Further, the optical system may include at least one lens to transmit an image to the image sensor. An actuator module executing both the autofocus function and the handshake compensation function may be installed in the optical system. The lens moving apparatus in accordance with the embodiment may serve as the actuator module executing both the autofocus function and the handshake compensation function.

The base 210 may execute the function of a sensor holder to protect the image sensor, but the disclosure is not limited thereto. That is, a separate sensor holder may be disposed under the base 210 and thus execute the image sensor protection function.

Hereinafter, stable feedback control of the lens driving apparatus 100 will be described. Here, stable feedback control may be referred to as AF driving control and/or OIS driving control so as to inhibit oscillation.

In order to execute stable feedback control, a design in which a secondary or higher-order resonant frequency deviates from an AF driving control and/or OIS driving control section is required. Further, a design in which a primary resonant frequency is located within the AF driving control and/or OIS driving control section is required.

For example, in a camera module for mobile terminals, a control section of frequency response characteristics for AF feedback control and/or OIS feedback control may be a section of 200 Hz or less and, in order to execute stable AF feedback control and/or OIS feedback control, a secondary resonant frequency of frequency response characteristics is designed so as to exceed 200 Hz.

First, relations among a transfer function, resonant frequencies and the thicknesses and widths of upper and lower elastic members for AF feedback driving control will be described.

The transfer function H for AF feedback driving control may be defined as Equation 1 below.

$$H = \frac{AFO}{AFI} \quad \text{[Equation 1]}$$

Here, AFO may be a sensing signal or a feedback signal of the first position sensor 170 and AFI may be an input signal supplied to the first coil 120, for example, supplied current.

Displacement of a moving unit may be determined based on the input signal AFI supplied to the first coil 120 and the output AFO of the first position sensor 170 may be determined according to the displacement of the moving unit.

The transfer function H may be a ratio of the output signal AFO of the first position sensor 170 to the input signal AFI supplied to the first coil 120.

Here, proportional integral derivative (PID) control may be reflected in the transfer function H. For example, the transfer function H may include a pole point and a zero point for PID control.

Through PID control, gain in a low-frequency range may be adjusted or lens moving apparatuses having different frequency characteristics according to products may be corrected so as to have the same gain value at the same position. Correction in which lens moving apparatuses having different frequency characteristics according to products have the same gain value at the same position is referred to as loop gain. Through loop gain, dispersion of lens moving apparatuses according to products may be reduced.

PID control may be executed by the first position sensor 170. Here, the first position sensor 170 may include a driver which may execute PID control.

Otherwise, PID control may not be reflected in the transfer function H. In this case, PID control may be executed by a driver mounted on the camera module and the first position sensor 170 may be a single Hall sensor.

A resonant frequency of frequency response characteristics according to gain of the transfer function H is inversely proportional to a root value of the weight of the moving unit and be directly proportional to a root value of a modulus of elasticity of upper and lower elastic members.

A primary resonant frequency of frequency response characteristics according to gain of the transfer function H may mean resonant frequency in the first direction (for example, the z-axis direction) and secondary and tertiary resonance frequencies may indicate resonance frequencies shifted or tilting in the second and third directions (for example, the x-axis and y-axis directions).

In order to execute stable AF feedback control, a primary resonant frequency of frequency response characteristics according to gain of the transfer function H for AF feedback driving control of the lens moving apparatus 100 may be in the range of 30 Hz to 200 Hz. Hz may be hertz which is the unit of frequency.

Figure 11:
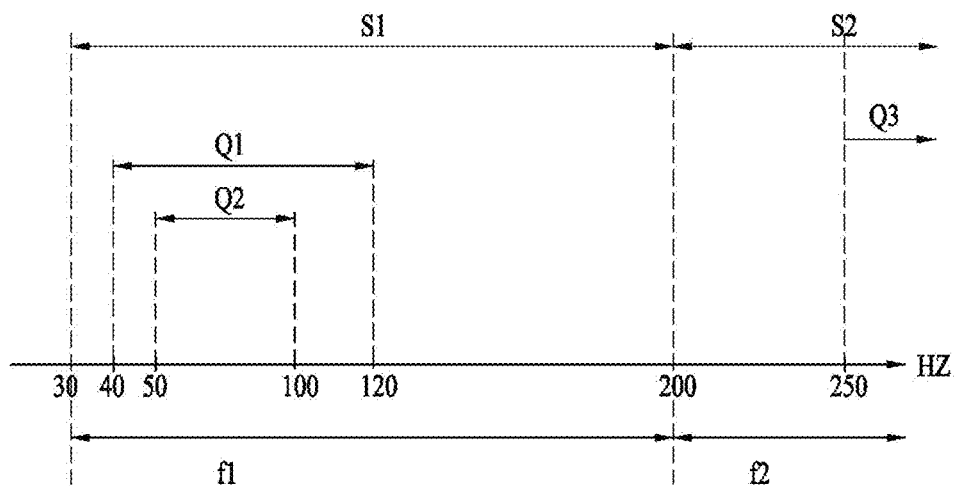
FIG. 11 is a graph illustrating primary and secondary resonance frequencies of frequency response characteristics according to gain of a transfer function in accordance with one embodiment.

FIG. 11 is a graph illustrating primary and secondary resonance frequencies f1 and f2 of frequency response characteristics according to gain of the transfer function H in accordance with one embodiment. The above-described PID control may be reflected in the transfer function H shown in FIG. 11.

With reference to FIG. 11, the primary resonant frequency f1 of frequency response characteristics according to gain of the transfer function H may have a first frequency domain S1 and the first frequency domain S1 may be a region which is in the range of 30 Hz to 200 Hz.

Further, in order to execute more stable AF feedback driving control, the primary resonant frequency f1 may have a second frequency domain Q1 and the second frequency domain Q1 may be a region which is in the range of 40 Hz to 120 Hz.

In order to secure a sufficient gain in a low frequency domain through PID control, the primary resonant frequency may have a third frequency domain Q2 and the third frequency domain Q2 may be a region which is in the range of 50 Hz to 100 Hz.

Further, in order to execute stable AF feedback driving control, the secondary resonant frequency f2 of frequency response characteristics according to gain of the transfer function H may have a fourth frequency domain S2 and the fourth frequency domain S2 may be a region exceeding 200 Hz.

That is, the secondary resonant frequency f2 of frequency response characteristics according to gain of a ratio of an output signal of the first position sensor 170 to an input signal applied to the first coil 120 may exceed 200 Hz.

For example, in order to execute more stable AF feedback driving control, the secondary resonant frequency f2 of frequency response characteristics according to gain of the transfer function H may have a fifth frequency domain Q3 and the fifth frequency domain Q3 may be a region which is equal to or more than 250 Hz.

A gain margin and a phase margin in frequency response characteristics according to gain of the transfer function H during AF feedback control may be used as indexes for feedback stability. The phase margin may mean a phase value at a position where gain crosses 0 dB, and the gain margin may mean a gain value at a position where phase crosses 0°.

In order to execute PID control, in frequency response characteristics according to gain of the transfer function H, a frequency corresponding to a gain of 0 dB may be 60 Hz to 200 Hz.

The primary resonant frequency of frequency response characteristics according to gain of the transfer function H may be determined by the moduli of elasticity of the upper and lower elastic members 150 and 160 in the first direction (for example, the z-axis direction) and the weight of an AF moving unit. The weight of the AF moving unit may include the weight of the lens barrel and the weight of the lens.

The secondary resonant frequency of frequency response characteristics according to gain of the transfer function H may be determined by the moduli of elasticity of the upper and lower elastic members 150 and 160 in the second and third directions (for example, the x-axis and y-axis directions).

For example, the AF moving unit may include a bobbin 110 and elements mounted on the bobbin 110 and moving together with the bobbin 110. For example, the AF moving unit may include at least the bobbin 110 and a lens (not shown) mounted on the bobbin 110 and further include, according to embodiments, at least one of the first coil 120, the sensing substrate 180, the first position sensor 170 and the first magnet 190.

The moduli of elasticity of the upper and lower elastic members 150 and 160 in the first direction may be directly proportional to the cubes of the thicknesses of the upper and lower elastic members 150 and 160, be directly proportional to the widths of the upper and lower elastic members 150 and 160, and be inversely proportional to the lengths of the upper and lower elastic members 150 and 160.

The upper and lower elastic members 150 and 160 in accordance with the embodiment may be leaf springs and, even if the upper and lower elastic members 150 and 160 are wire springs or coil springs, relations among the moduli of the upper and lower elastic members 150 and 160 and the widths and thicknesses of the upper and lower elastic members 150 and 160 may be the same as those of the embodiment.

On the other hand, the moduli of elasticity of the upper and lower elastic members 150 and 160 in the second and third directions may be directly proportional to the cubes of the widths of the upper and lower elastic members 150 and 160, be directly proportional to the thicknesses of the upper and lower elastic members 150 and 160, and be inversely proportional to the lengths of the upper and lower elastic members 150 and 160.

Figure 12:
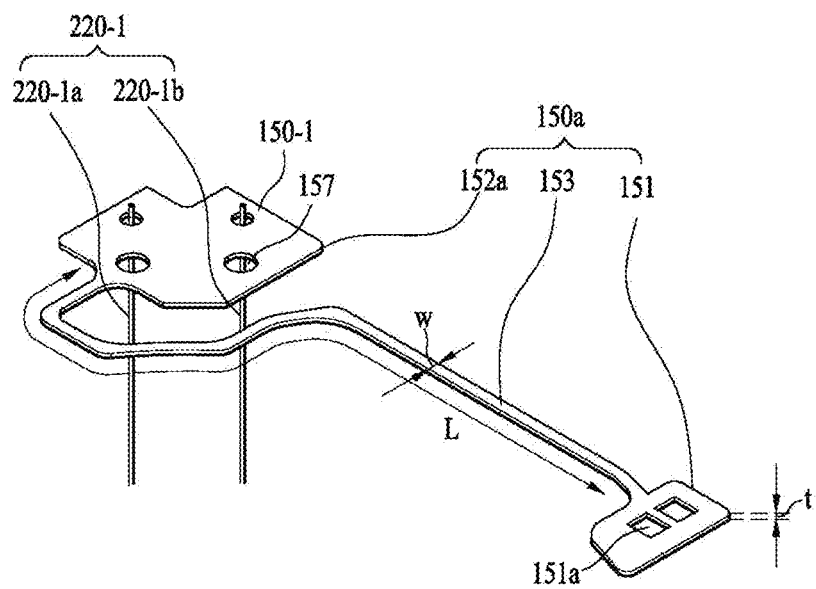
FIG. 12 is an enlarged view of a first upper elastic member shown in FIG. 9.

FIG. 12 is an enlarged view of the first upper elastic member 150-1 shown in FIG. 9.

With reference to FIG. 12, the modulus of elasticity of the first upper elastic member 150-1 in the z-axis direction may be directly proportional to the cube of the thickness t of the first upper elastic member 150-1, be directly proportional to the width W of the first upper elastic member 150-1, and be inversely proportional to the length L of the first upper elastic member 150-1.

The width, length and thickness of the first upper elastic member 150-1 may be the width, length and thickness of an elastically deformed part of the first upper elastic member 150-1 except for both ends thereof fixed to the bobbin 110 and the housing 140.

For example, the width W of the first upper elastic member 150-1 may be the width of the first frame connection part 153 and the length L of the first upper elastic member 150-1 may be the length of the first frame connection part 153.

On the other hand, the modulus of elasticity of the first upper elastic member 150-1 in the x-axis and y-axis directions may be directly proportional to the cubes of the width W of the first upper elastic member 150-1, be directly proportional to the thickness of the first upper elastic member 150-1, and be inversely proportional to the length of the first upper elastic member 150-1.

For example, when the primary resonant frequency of frequency response characteristics according to gain of the transfer function H of the lens moving apparatus 100 is 60 Hz, the weight of the AF moving unit is 0.3 g, and the modulus of elasticity K of the upper and lower elastic members 150 and 160 is 44 N/m, in order to form a secondary resonant frequency of 200 Hz, the modulus of elasticity K of the upper and lower elastic members 150 and 160 in the second and third directions needs to be about 500 N/m. Here, the modulus of elasticity K of the upper and lower elastic members 150 and 160 in the second and third directions may be about 11 times the modulus of elasticity K of the upper and lower elastic members 150 and 160 in the first direction.

Further, in order to form a secondary resonant frequency of 300 Hz under the same condition, the modulus of elasticity K of the upper and lower elastic members 150 and 160 in the second and third directions needs to be about 1100 N/m. Here, the modulus of elasticity K of the upper and lower elastic members 150 and 160 in the second and third directions may be about 25 times the modulus of elasticity K of the upper and lower elastic members 150 and 160 in the first direction.

Further, for example, in order to form a primary resonant frequency of 30 Hz to 200 Hz and to form a secondary resonant frequency exceeding 200 Hz in frequency response characteristics according to gain of the transfer function H of the lens moving apparatus 100, the widths of the upper and lower elastic members 150 and 160 of the lens moving apparatus 100 may be predetermined times or more the thicknesses t of the upper and lower elastic members 150 and 160. Here, the predetermined times may be 2 times to 3 times.

For example, the widths of the upper and lower elastic members 150 and 160 may be 2 times to 3 times the thicknesses t of the upper and lower elastic members 150 and 160.

For example, when the thickness of the upper and lower elastic members 150 and 160 is 40 μm and the primary resonant frequency of frequency response characteristics according to gain of the transfer function H of the lens moving apparatus 100 is 60 Hz, in order to form the secondary resonant frequency exceeding 200 Hz, the upper and lower elastic members 150 and 160 may have a width of at least 90 μm.

Further, for example, when the thickness of the upper and lower elastic members 150 and 160 is 40 μm and the primary resonant frequency of frequency response characteristics according to gain of the transfer function H of the lens moving apparatus 100 is 60 Hz, in order to form the secondary resonant frequency exceeding 300 Hz, the upper and lower elastic members 150 and 160 may have a width of at least 116 μm.

The thicknesses of the upper and lower elastic members 150 and 160 in accordance with the embodiment may be 30 μm to 50 μm.

In order to form a primary resonant frequency of 30 Hz to 200 Hz and to form a secondary resonant frequency exceeding 200 Hz in frequency response characteristics according to gain of the transfer function H of the lens moving apparatus 100, the widths of the upper and lower elastic members 150 and 160 in accordance with the embodiment may be equal to or more than a reference width. Here, the reference width may be 60 μm to 100 μm.

Figure 13:
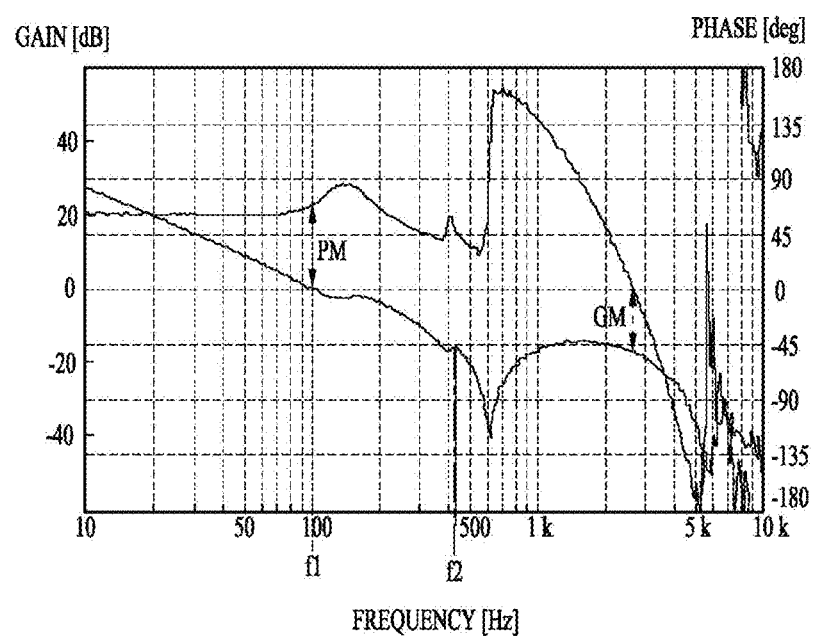
FIG. 13 is a graph illustrating frequency response characteristics according to gain and frequency response characteristics according to phase of a transfer function according to AF feedback driving control of a lens moving apparatus in accordance with one embodiment.

FIG. 13 is a graph illustrating frequency response characteristics according to gain and frequency response characteristics according to phase of a transfer function H according to AF feedback driving control of a lens moving apparatus in accordance with one embodiment.

With reference to FIG. 13, it may be understood that, in frequency response characteristics according to gain of the transfer function H according to AF feedback driving control, a primary resonant frequency f1 is 100 Hz and a secondary resonant frequency f2 is 420 Hz.

In order to execute stable AF feedback driving control, in frequency response characteristics according to gain, a gain margin needs to be about 12 dB or more and a phase margin needs to be 45° or more.

It may be understood from FIG. 13 that a gain margin GM is 18 dB and a phase margin PM is about 66° and therethrough the embodiment may secure stability in AF driving control.

Further, by executing a damping process on the upper and lower elastic members 150 and 160, the AF moving unit or a stationary unit, the peak of the gain in resonant frequency may be reduced.

Next, relations among a transfer function, resonant frequencies and the thicknesses and widths of upper and lower elastic members for OIS feedback driving control will be described.

The transfer function $H_{OIS}$ for OIS feedback driving control may be defined as Equation 2 below.

$$H_{OIS} = \frac{AFO_{OIS}}{AFI_{OIS}} \qquad \text{[Equation 2]}$$

Here, $AFO_{OIS}$ may be an output signal from the second position sensor 240 and $AFI_{OIS}$ may be an input signal supplied to the second coil 230.

For example, $AFO_{OIS}$ may be an output signal from the second position sensor 240-1 and $AFI_{OIS}$ may be an input signal supplied to the second coil 230 corresponding to the second position sensors 240-1.

Further, for example, $AFO_{OIS}$ may be an output signal from the second position sensor 240-2 and $AFI_{OIS}$ may be an input signal supplied to the second coil 230 corresponding to the second position sensor 240-2.

PID control for rapid OIS feedback control in a low frequency domain may be reflected in the transfer function $H_{OIS}$ or may not be reflected in the transfer function $H_{OIS}$. For example, the transfer function $H_{OIS}$ may include a pole point and a zero point for PID control.

PID control may be executed by the second position sensors 240 or a driver mounted on the camera module. For example, the second position sensors 240; 240-1 and 240-2 may include drivers to execute proportional integral derivative (PID) control.

Displacement of an OIS moving unit may be determined based on the input signal $AFI_{OIS}$ supplied to the second coil 230 and the output $AFO_{OIS}$ of the second position sensor 240 may be determined according to the displacement of the OIS moving unit. The transfer function $H_{OIS}$ may be a ratio of the output signal $AFO_{OIS}$ of the second position sensor 240 to the input signal $AFI_{OIS}$ supplied to the second coils 230.

The OIS moving unit may include the above-described AF moving unit and the elements mounted in the housing 140. For example, the OIS moving unit may include at least the AF moving unit and the housing 140 and further include the first magnet 190 and the second magnets 130-1 to 130-4 according to embodiments.

A primary resonant frequency of frequency response characteristics according to gain of the transfer function $H_{OIS}$ may mean a resonant frequency in the second or third direction (for example, the x-axis or y-axis direction) and secondary and tertiary resonance frequencies may mean resonance frequencies shifted or tilting in the first direction (for example, the z-axis direction).

In order to execute stable OIS feedback control in the second and third directions, a primary resonant frequency of frequency response characteristics according to gain of the transfer function $H_{OIS}$ for OIS feedback driving control of the lens moving apparatus 100 may be in the range of 30 Hz to 200 Hz.

That is, the primary resonant frequency of frequency response characteristics according to gain of a ratio of an output signal of the second position sensor 240 to an input signal applied to the second coil 230 may be in the range of 30 Hz to 200 Hz.

For example, in order to execute stable OIS feedback driving control, the primary resonant frequency of frequency response characteristics according to gain of the transfer function $H_{OIS}$ may be 40 Hz to 120 Hz.

For example, in order to execute more stable OIS feedback driving control, the primary resonant frequency of frequency response characteristics according to gain of the transfer function $H_{OIS}$ may be 50 Hz to 100 Hz.

Further, in order to execute stable OIS feedback driving control, the secondary resonant frequency of frequency response characteristics according to gain of the transfer function $H_{OIS}$ may exceed 200 Hz.

That is, the secondary resonant frequency of frequency response characteristics according to gain of a ratio of an output signal of the second position sensor 240 to an input signal applied to the second coil 230 may exceed 200 Hz.

For example, in order to execute more stable OIS feedback driving control, the secondary resonant frequency of frequency response characteristics according to gain of the transfer function $H_{OIS}$ may be equal to or more than 250 Hz.

In order to secure a gain at a low frequency, in frequency response characteristics according to gain of the transfer function $H_{OIS}$, a frequency having a gain of 0 dB may be 60 Hz to 200 Hz.

In general, a frequency used during OIS feedback driving may be 20 Hz or less. By designing a frequency corresponding to a gain of 0 dB in frequency response characteristics according to gain of the transfer function $H_{OIS}$ to be two times or more the frequency used during OIS feedback driving, OIS characteristics may be satisfied and stable OIS feedback driving may be secured.

Since, as described above, the widths of the upper and lower elastic members 150 and 160 of the lens moving apparatus 100 are predetermined times or more the thicknesses t of the upper and lower elastic members 150 and 160, the primary resonant frequency of frequency response characteristics according to gain of the transfer function $H_{OIS}$ may be 30 Hz to 200 Hz and the secondary resonant frequency may exceed 200 Hz.

As is apparent from the above description, a lens moving apparatus 100 in accordance with one embodiment designs the widths of upper and lower elastic members 150 and 160 to be predetermined times or more the thicknesses of upper and lower elastic members 150 and 160 and may thus execute stable and accurate AF feedback control and OIS feedback control. Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens moving apparatus comprising:
a housing;
a bobbin disposed in the housing;
a first coil disposed on the bobbin;
a magnet disposed on the housing and facing the first coil;
an elastic member coupled with the bobbin and the housing;
a sensing magnet disposed on the bobbin; and
a position sensor disposed opposite to the sensing magnet and configured to output an output signal,
wherein an input signal is applied to the first coil and the first coil is configured to move the bobbin in a direction of an optical axis by an interaction with the magnet,
wherein a primary resonant frequency of frequency response characteristics is in a range of 30 Hz to 200 Hz, and
wherein the frequency response characteristics are related to gain of a transfer function,
wherein the transfer function is defined by Equation (1), $$H = \frac{AFO}{AFI} \quad (1)$$

wherein H stands for the transfer function, AFO stands for the output signal of the position sensor, and AFI stands for the input signal applied to the first coil.

2. The lens moving apparatus according to claim 1, wherein the elastic member comprises an inner frame coupled with the bobbin, an outer frame coupled with the housing, and a frame connection part configured to connect the inner frame and the outer frame, and
wherein a width of the frame connection part is at least two times greater than a thickness of the elastic member.

3. The lens moving apparatus according to claim 1, wherein the input signal is configured to be applied to the first coil to move the bobbin in the direction along the optical axis, wherein the output signal is based on an electromagnetic force being sensed by the position sensor, and wherein a secondary resonant frequency of the frequency response characteristics according to the gain of the ratio of the output signal of the position sensor to the input signal applied to the first coil exceeds 200 Hz.

4. The lens moving apparatus according to claim 3, wherein the primary resonant frequency is in a range of 40 Hz to 120 Hz and the secondary resonant frequency is equal to or greater than 250 Hz.

5. The lens moving apparatus according to claim 3, wherein the primary resonant frequency is in a range of 50 Hz to 100 Hz and the secondary resonant frequency is equal to or greater than 250 Hz.

6. The lens moving apparatus according to claim 1, comprising:
a circuit board disposed under the housing;
a circuit member disposed on the circuit board and comprising a second coil disposed opposite to the magnet; and
a base disposed under the circuit board.

7. The lens moving apparatus according to claim 6, wherein the elastic member comprises:
an upper elastic member coupled with an upper portion of the bobbin and an upper portion of the housing; and
a lower elastic member coupled with a lower portion of the bobbin and a lower portion of the housing.

8. The lens moving apparatus according to claim 7, comprising a support member connecting the upper elastic member and the circuit board.

9. The lens moving apparatus according to claim 8, wherein the circuit board comprises a terminal electrically connected to the support member.

10. The lens moving apparatus according to claim 7, wherein the upper elastic member comprises:
a first inner frame coupled with the bobbin;
a first outer frame coupled with the housing; and
a first frame connection part configured to connect the first inner frame and the first outer frame,
wherein the lower elastic member comprises:
a second inner frame coupled with the bobbin;
a second outer frame coupled with the housing; and
a second frame connection part configured to connect the second inner frame and the second outer frame, and
wherein a width of the first frame connection part is at least two times greater than a thickness of the upper elastic member, and a width of the second frame connection part is at least two times greater than a thickness of the lower elastic member.

11. The lens moving apparatus according to claim 7, wherein a thickness of each of the upper elastic member and the lower elastic member is in a range of 30 μm to 50 μm, and
wherein a width of each of the upper elastic member and the lower elastic member is correspondingly equal to or greater than a range of 60 μm to 100 μm.

12. The lens moving apparatus according to claim 1, wherein a frequency corresponding to a gain of 0 dB of the frequency response characteristics according to the gain of the ratio of the output signal of the position sensor to the input signal applied to the first coil is in a range of 60 Hz to 200 Hz.

13. A lens moving apparatus comprising:
a housing;
a bobbin disposed in the housing;
a first coil disposed on the bobbin;
a magnet disposed on the housing;
an elastic member coupled with the bobbin and the housing;

a sensing magnet disposed on the bobbin;

a first position sensor disposed opposite to the sensing magnet and configured to output a first output signal related to the sensing magnet;

a second coil disposed opposite to the magnet; and a second position sensor configured to output a second output signal related to the magnet, wherein a first input signal is applied to the first coil to move the bobbin in a direction along an optical axis, and a second input signal is applied to the second coil to move the housing in a direction perpendicular to the optical axis, wherein a primary resonant frequency of first frequency response characteristics has a frequency domain of 30 Hz to 200 Hz, and the first frequency response characteristics are related to a gain of a ratio of the second output signal of the second position sensor to the second input signal applied to the second coil, wherein a resonant frequency of the first frequency response characteristics has a frequency domain exceeding 200 Hz.

14. The lens moving apparatus according to claim 13, wherein the elastic member comprises an inner frame coupled with the bobbin, an outer frame coupled with the housing, and a frame connection part configured to connect the inner frame and the outer frame, and wherein a width of the frame connection part is at least two times greater than a thickness of the elastic member.

15. The lens moving apparatus according to claim 13, wherein a primary resonant frequency of second frequency response characteristics is in a range of 30 Hz to 200 Hz, and the second frequency response characteristics are related to a gain of a ratio of the first output signal of the first position sensor to the first input signal applied to the first coil.

16. The lens moving apparatus according to claim 13, wherein the thickness of each of the upper and lower elastic members is in a range of 30 μm to 50 μm, and the width of each of the upper and lower elastic members is correspondingly equal to or greater than a range of 60 μm to 100 μm.

17. The lens moving apparatus according to claim 13, comprising:

a circuit board disposed under the housing; and a base disposed under the circuit board.

18. The lens moving apparatus according to claim 17, wherein the elastic member is coupled with an upper portion of the bobbin and an upper portion of the housing, and comprising a support member connecting the elastic member and the circuit board.

19. The lens moving apparatus according to claim 18, wherein the magnet comprises four magnets disposed on the housing, and wherein the second coil comprises:

a circuit member disposed on the circuit board; and four coils formed in the circuit member and opposite to the four magnets, respectively.

20. The lens moving apparatus according to claim 13, wherein each of the first position sensor and the second position sensor includes a driver to execute proportional integral derivative (PID) control.

* * * * *